(12) United States Patent
Schwiesow

(10) Patent No.: US 12,504,522 B2
(45) Date of Patent: Dec. 23, 2025

(54) AUTOMATIC DETECTION OF A CALIBRATION STANDARD IN UNSTRUCTURED LIDAR POINT CLOUDS

(71) Applicant: THE BOEING COMPANY, Chicago, IL (US)

(72) Inventor: Michael Brandon Schwiesow, Madison, AL (US)

(73) Assignee: THE BOEING COMPANY, Arlington, VA (US)

( * ) Notice: Subject to any disclaimer, the term of this patent is extended or adjusted under 35 U.S.C. 154(b) by 1017 days.

(21) Appl. No.: 17/647,890

(22) Filed: Jan. 13, 2022

(65) Prior Publication Data

US 2022/0365186 A1 Nov. 17, 2022

Related U.S. Application Data

(60) Provisional application No. 63/183,176, filed on May 3, 2021.

(51) Int. Cl.
*G01S 7/497* (2006.01)
*G01S 17/89* (2020.01)
(Continued)

(52) U.S. Cl.
CPC .............. *G01S 7/497* (2013.01); *G01S 17/89* (2013.01); *G06T 7/80* (2017.01); *G06T 7/97* (2017.01); *G06T 2207/10028* (2013.01)

(58) Field of Classification Search
CPC . G01S 7/497; G01S 17/89; G06T 7/80; G06T 7/97; G06T 2207/10028; G06T 2207/30208; G06T 7/11
(Continued)

(56) References Cited

U.S. PATENT DOCUMENTS 9,676,330 B2 * 6/2017 Takemae ................ G06V 20/58
10,838,049 B1 11/2020 Schwiesow
(Continued)

FOREIGN PATENT DOCUMENTS

CN 107765257 A * 3/2018 ............. G01S 17/02
CN 108665472 A * 10/2018 ............. G06T 7/136
(Continued)

OTHER PUBLICATIONS

Extended European Search Report for Application No. 22166110.1 dated Oct. 10, 2022, 9 pgs.
(Continued)

*Primary Examiner* — Henok Shiferaw
*Assistant Examiner* — Dion J Satcher
(74) *Attorney, Agent, or Firm* — Moore IP Law

(57) ABSTRACT

Systems and methods include obtaining point cloud data representing a point cloud; selecting a subset of the point cloud data based at least in part on a contour metric; grouping sets of points of the subset of the point cloud into one or more clusters based at least in part on one or more distance metrics; for a cluster that satisfies one or more cluster size criteria based on dimensions of a calibration standard, determining whether a distribution of signal intensities of points of the cluster satisfies a distribution criterion; based on a determination that the distribution of signal intensities of points satisfies the distribution criterion, determining boundaries of a region that represents the calibration standard; and storing data identifying a set of points of the point cloud that correspond to the calibration standard.

20 Claims, 15 Drawing Sheets

(51) Int. Cl.
  *G06T 7/00* (2017.01)
  *G06T 7/11* (2017.01)
  *G06T 7/80* (2017.01)

(58) Field of Classification Search
  USPC .......................................................... 382/173
  See application file for complete search history.

(56) References Cited

U.S. PATENT DOCUMENTS

| | | | |
|---|---|---|---|
| 10,841,496 B2 | 11/2020 | Wheeler et al. | |
| 11,861,870 B2 | 1/2024 | Schwiesow | |
| 2019/0082156 A1* | 3/2019 | Zhang | G06T 7/85 |
| 2019/0122386 A1* | 4/2019 | Wheeler | G01C 21/1652 |
| 2019/0205695 A1* | 7/2019 | Yan | G06V 10/757 |
| 2020/0043186 A1* | 2/2020 | Selviah | G06T 7/33 |
| 2021/0004610 A1* | 1/2021 | Huang | G01S 17/10 |

FOREIGN PATENT DOCUMENTS

| | | | | |
|---|---|---|---|---|
| CN | 111260735 A | * | 6/2020 | G06F 18/22 |
| CN | 111862224 A | * | 10/2020 | G01S 17/87 |
| WO | WO-2020146547 A1 | * | 7/2020 | G06T 9/004 |

OTHER PUBLICATIONS

Verma, Surabhi et al., "Automatic extrinsic calibration between a camera and a 3D Lidar using 3D point and plane correspondences," 2019 IEEE Intelligent Transportation Systems Conference (ITSC), Auckland, NA, Oct. 27-30, 2019, pp. 3906-3912.

"Camera Calibration and 3D Reconstruction," https://docs.opencv.org/2.4/modules/calib3d/doc/camera_calibration_and_3d_reconstruction.html; pp. 1-50.

Fischler, Martin et al., "Random Sample Consensus: A Paradigm for Model Fitting with Applications to Image Analysis and Automated Cartography," ACM 1981, pp. 381-395.

Ioannou, Yani et al., "Difference of Normals as a Multi-Scale Operator in Unorganized Point Clouds," IEEE, availarXiv: 1209.1759v1 [cs.CV] Sep. 8, 2012, pp. 1-9.

Kim, Eung-Su, et al. "Extrinsic Calibration between Camera and LiDAR SEnsors by Matching Multiple 3D Planes," Sensors 2020, vol. 20, Issue 52, doi:10.3390/s20010052; www.mdpi.com/journal/sensors, pp. 1-17.

Mohammed, Minhaj Palakkaparambil, "Lidar Camera Calibration with MATLAB," mathworks.com/videos/lidar-camera-calibration-with-matlab-1599735711875.html, pp. 1-2.

Park, Yoonsu et al., " Calibration between Color Camera and 3D Lidar Instruments with a Polygonal Planar Board," Sensors, 2014, vol. 14, doi:10.3390/s140305333; pp. 5333-5353.

Zhou, Lipu et al., "Automatic Extrinsic Calibration of a Camera and a 3D LiDAR using Line and Plane Correspondences," Robotics Institute, Carnegie Mellon University, pp. 1-8.

* cited by examiner

AUTOMATIC DETECTION OF A CALIBRATION STANDARD IN UNSTRUCTURED LIDAR POINT CLOUDS

FIELD OF THE DISCLOSURE

The subject disclosure is generally related to light detection and ranging (lidar) and camera sensors. In particular, the subject disclosure relates to automatic detection of a calibration standard in an unstructured lidar point cloud.

BACKGROUND

Multiple sensors can be mapped to a common frame of reference to facilitate fusing information from the multiple sensors. One way to do this is via extrinsic calibration of sensor pairs.

Existing methods survey the position and orientation (also referred to as pose) of each sensor by external means in a controlled environment (also known as a scene). Typically, the survey will use metrological methods to locate each sensor in a common reference frame. These methods can be limited by access (e.g., by using a confined space) and/or line-of-sight constraints to the sensors. In some circumstances, the sensor platform can be disassembled to enable access. Some methods use known calibration targets and other fiducials arranged in meticulously staged scenes. This translates to an expensive and time-consuming process which often cannot be performed in the field. As the actual sensor poses drift over time and the sensor(s) become misaligned, the sensor platform would have to be pulled from service to perform a new calibration.

SUMMARY

In a particular implementation, a method includes obtaining, at one or more processors, point cloud data representing locations in three-dimensional (3D) space of points of a point cloud. The method also includes selecting for further processing by the one or more processors one or more subsets of the point cloud data based at least in part on a contour metric. The method also includes grouping, by the one or more processors, sets of points of the one or more subsets of the point cloud into one or more clusters based at least in part on one or more distance metrics. The method also includes, for a cluster that satisfies one or more cluster size criteria based on dimensions of a calibration standard, determining, by the one or more processors, whether a distribution of signal intensities of points of the cluster satisfies a distribution criterion. The method further includes, based on a determination that the distribution of signal intensities of points satisfies the distribution criterion, determining, by the one or more processors based on the cluster, boundaries of a region that represents the calibration standard and storing, by the one or more processors, data identifying a set of points of the point cloud that correspond to the calibration standard, the set of points identified based on the boundaries of the region that represents the calibration standard.

In another particular implementation, a system includes a memory configured to store instructions and one or more processors configured to obtain point cloud data representing locations in three-dimensional (3D) space of points of a point cloud. The one or more processors are further configured to select for further processing by the one or more processors one or more subsets of the point cloud data based at least in part on a contour metric. The one or more processors are further configured to group sets of points of the one or more subsets of the point cloud into one or more clusters based at least in part on one or more distance metrics. The one or more processors are also configured to, for a cluster that satisfies one or more cluster size criteria based on dimensions of a calibration standard, determine whether a distribution of signal intensities of points of the cluster satisfies a distribution criterion. The one or more processors are further configured to, based on a determination that the distribution of signal intensities of points satisfies the distribution criterion, determine, based on the cluster, boundaries of a region that represents the calibration standard and store data identifying a set of points of the point cloud that correspond to the calibration standard, the set of points identified based on the boundaries of the region that represents the calibration standard.

In another particular implementation, a non-transitory, computer readable medium stores instructions that, when executed by one or more processors, cause the one or more processors to initiate, perform, or control operations including: obtaining point cloud data representing locations in three-dimensional (3D) space of points of a point cloud. The operations also include selecting for further processing by the one or more processors one or more subsets of the point cloud data based at least in part on a contour metric. The operations also include grouping sets of points of the one or more subsets of the point cloud into one or more clusters based at least in part on one or more distance metrics. The operations further include, for a cluster that satisfies one or more cluster size criteria based on dimensions of a calibration standard, determining whether a distribution of signal intensities of points of the cluster satisfies a distribution criterion. The operations also include, based on a determination that the distribution of signal intensities of points satisfies the distribution criterion, determining, based on the cluster, boundaries of a region that represents the calibration standard and storing data identifying a set of points of the point cloud that correspond to the calibration standard, the set of points identified based on the boundaries of the region that represents the calibration standard.

The features, functions, and advantages described herein can be achieved independently in various implementations or can be combined in yet other implementations, further details of which can be found with reference to the following description and drawings.

DETAILED DESCRIPTION

Aspects disclosed herein present systems and methods for establishing an extrinsic relationship between a light detection and ranging (lidar) sensor and a camera. In particular, the systems and methods of the subject disclosure allow for automatic detection of a calibration standard in an unstructured lidar point cloud. To meaningfully fuse the information from multiple sensors, a common frame of reference is established to link the independent frames of reference of the multiple sensors. This can be accomplished through extrinsic calibration of sensor pairs.

The disclosed systems and methods enable mapping two or more complementary sensor systems (e.g., a 3D lidar and a camera) to a common reference frame so that the information provided by each individual sensor can be fused together to provide a more complete and robust perception of the world for autonomous systems. The disclosed system enables automatically detecting a single, simple calibration standard (e.g., a planar chessboard) in an unstructured lidar point cloud (e.g., an unstructured lidar point cloud generated by a lidar scan of a calibration scene). This can translate into a procedure which can be performed both in the field and as necessary. For example, the procedure can be performed as part of pre-flight maintenance for an aircraft.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents. Particular implementations are described herein with reference to the drawings. In the description, common features are designated by common reference numbers throughout the drawings.

Figure 1:
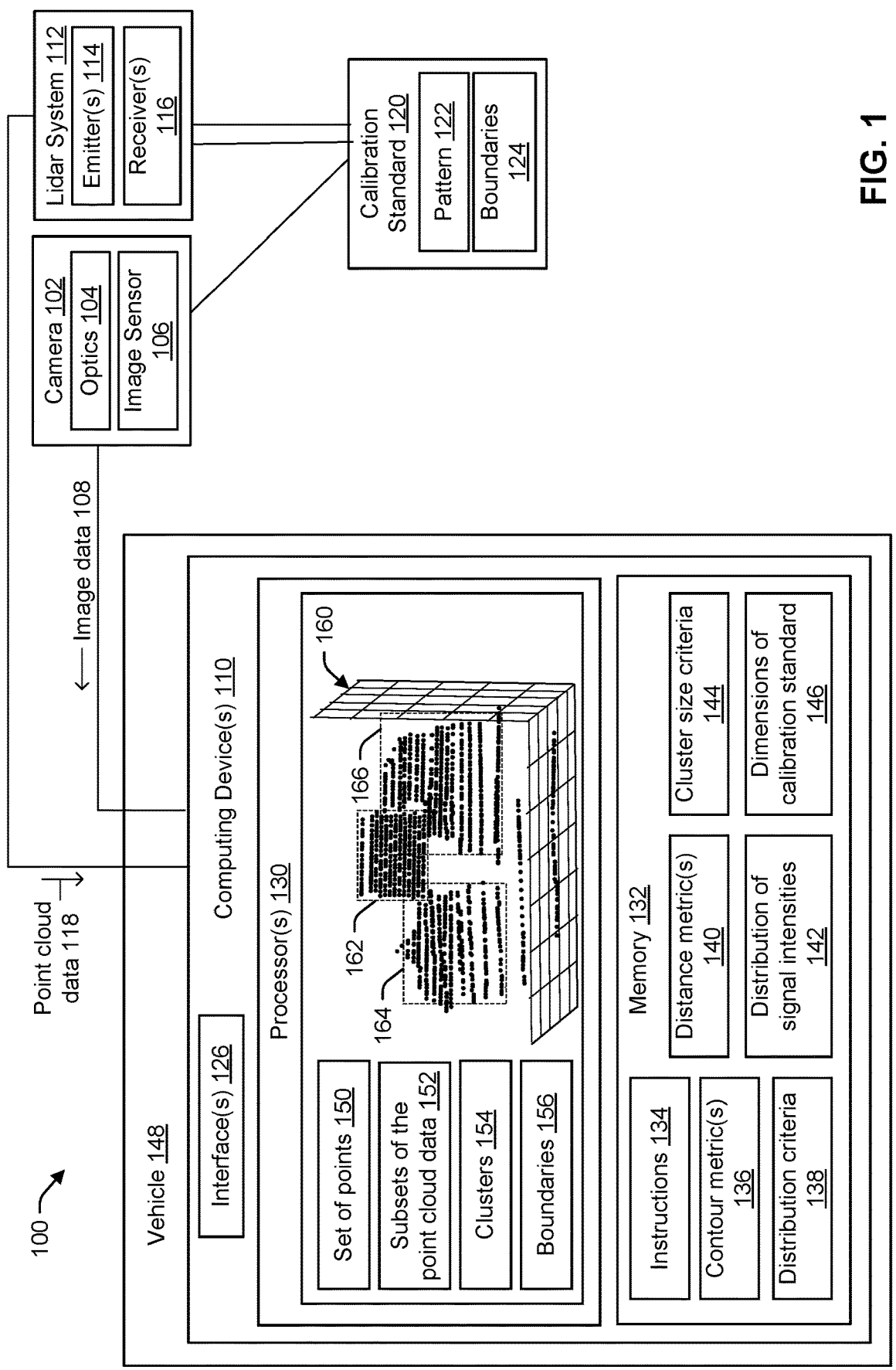
FIG. 1 depicts an example system for automatically detecting a calibration standard in an unstructured point cloud, in accordance with at least one embodiment of the subject disclosure.

As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 1 depicts a computing system 100 including one or more computing devices 110, which indicates that in some implementations the system 100 includes a single computing device 110 and in other implementations the system 100 includes multiple computing devices 110. For ease of reference herein, such features are generally introduced as "one or more" features and are subsequently referred to in the singular unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary' indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 depicts an example system 100 for automatically detecting a calibration standard in an unstructured point cloud, in accordance with at least one embodiment of the subject disclosure. In some embodiments, system 100 includes a vehicle 148 configured for calibration between a pair of sensors (e.g., lidar system 112 and a camera 102) using a calibration standard 120 within the sensor ranges of both camera 102 and lidar system 112.

In some embodiments, vehicle 148 can be an aircraft, automobile, truck, or other vehicle using sensor pairs. In the same or alternative embodiments, vehicle 148 can be a structure (e.g., house, building, etc.) using sensor pairs. In further same or alternative embodiments, vehicle 148 can be a component of a vehicle, a component of a structure, and/or any combination of a vehicle, structure, component of a vehicle, or a component of a structure.

In some embodiments, a sensor pair of system 100 includes a lidar system 112 and a camera 102, as described in more detail below. In some configurations, one or more sensors of the sensor pair (e.g., the lidar system 112 and/or the camera 102) can be coupled to the vehicle 148. In some implementations, camera 102 can include one or more optics 104 and one or more image sensor(s) 106 to capture some or all of the image data 108 from the calibration standard 120.

In some embodiments, the sensor pair (e.g., the lidar system 112 and the camera 102) can be calibrated using a calibration standard 120 within the sensor ranges of both the camera 102 and the lidar system 112. In some configurations, the calibration standard 120 can include a predetermined pattern 122 and boundaries 124. For example, calibration standard 120 can be a chessboard-type standard ("chessboard) comprising alternating black-and-white squares (e.g., the pattern 122) within certain borders (e.g., the boundaries 124). In an exemplary configuration, the dimensions of the pattern 122 and the boundaries 124 are known prior to calibration (e.g., as dimensions of calibration standard 146).

In some configurations, the lidar system 112 includes one or more emitters 114 and one or more receivers 116. During an exemplary operation of the example system 100, at least one emitter 114 of the lidar system 112 transmits one or more transmit signal(s) toward the calibration standard 120 (e.g., a chessboard), while the calibration standard 120 is in a particular location and/or orientation. In one or more embodiments, the transmit signal(s) can include optical signals and/or infrared signals. The transmit signal(s) reflects off the calibration standard 120 to generate at least one reflection signal(s). During an exemplary operation of the example system 100, the receiver(s) 116 of the lidar system 112 receive the reflection signal(s). In some configurations, the lidar system 112 communicates point cloud data 118 to the computing device(s) 110. In some embodiments, the point cloud data 118 is based at least on the reflection signal(s) received by the lidar system 112.

During an exemplary operation of the example system 100, subsequently or simultaneously to the transmit signal(s) reflecting off the calibration standard 120, the camera 102 captures an image of the calibration standard 120 to obtain the image data 108. In some configurations, the camera 102 communicates the image data 108 to the computing device(s) 110.

In some embodiments, the calibration standard 120 can be moved to different locations that are further or closer in distance to the lidar system 112 and/or the camera 102. The calibration standard 120 can also, or alternatively, be rotated about any axis to be oriented in different orientations.

As illustrated in the example system 100, the computing device(s) 110 are located within the vehicle 148, remote from the camera 102 and/or the lidar system 112. In some embodiments, the computing device(s) 110 can be located within the lidar system 112, within the camera 102, within another sensor used by the vehicle 148, within another vehicle, within another sensor used by another vehicle, or at any other appropriate location. Further, in some configurations, the lidar system 112 and the camera 102 are housed together and/or mounted together on the vehicle 148. In other embodiments, the lidar system 112 and the camera 102 are located at separate locations. Further, components of the computing device(s) 110 can be distributed to one or more locations without departing from the scope of the present disclosure. For example, the processor(s) 130 can be housed together with or located remotely from the memory 132.

In some embodiments, the computing device(s) 110 receives the point cloud data 118 and/or the image data 108 one or more via interfaces 126. In some configurations, the interface(s) 126 can include one or more input/output interface(s), as described in more detail below with reference to FIG. 15.

In some embodiments, the computing device(s) 110 can store the point cloud data 118 and/or the image data 108 (e.g., in a memory 132) for further processing. As described in more detail below with reference to FIGS. 2-14, the computing device(s) 110 can process and analyze the point cloud data 118 and the image data 108 to automatically detect the calibration standard 120. In some embodiments, the point cloud data 118 represents locations in three-dimensional (3D) space of points of a point cloud. Each point of the point cloud corresponds to a location at which a transmit signal from the lidar system 112 reflected off various objects in a calibration scene, wherein the object in the calibration scene includes the calibration standard 120).

Processing (e.g., by the processor(s) 130) the point cloud data 118 can be resource-intensive due to the potentially large number of points of the point cloud data 118. In some embodiments, therefore, the processor(s) 130 can select one or more subsets of the point cloud data 152 for further processing to process the point cloud data 118 more efficiently (e.g., to use fewer computing resources). As described in more detail below with reference to FIGS. 2-5, selecting one or more subsets of the point cloud data 152 can be based at least in part on a contour metric 136, which can be stored in the memory 132. For example, processor(s) 130 can select a subset of the point cloud data 152 based on a "difference of normals" filter, which is described in more detail below with reference to FIGS. 2-5.

FIG. 1 depicts a non-limiting example of a set of points of a point cloud disposed within a three-dimensional space 160. In FIG. 1, the point cloud corresponds to at least a portion of a calibration scene. In the example illustrated in FIG. 1, the point cloud includes points representing locations within the calibration scene, including a set of points 162 representing a chessboard calibration standard and sets of points 164 and 166 representing other objects in the calibration scene. To process the point cloud data 118, the processor(s) 130 perform multiple operations, as described further herein, to identify the set of points 162 that represents the calibration standard 120. For example, the processor(s) 130 apply a contour metric (e.g., a difference of normals filter) to select groups of points of the point cloud that satisfy the contour metric. In this example, the contour metric may be satisfied by points that are on a plane. The processor(s) 130 can also be configured to, for example, select the largest group of points with a similar contour. In the example illustrated in FIG. 1, the largest group of points with a similar contour is represented by the set of points 162, which the processor(s) 130 can select for further processing as the group of points of the point cloud that most likely corresponds to the calibration standard 120.

In some embodiments, the processor(s) 130 also group sets of points of the one or more subsets of the point cloud 152 into one or more clusters 154 based at least in part on one or more distance metrics 140, which can be stored in the memory 132. For example, the processor(s) 130 can group all points of the one or more subsets of the point cloud data 152 that are within a predetermined Euclidean distance from a plane onto which the one or more subsets of the point cloud data 152 have been projected (e.g., by the processor(s) 130), as described in more detail below with reference to FIGS. 2-5.

In some embodiments, the processor(s) 130 can determine whether a distribution of signal intensities of points of the cluster 154 satisfies certain distribution criteria 138, which can be stored in the memory 132. In some configurations, the processor(s) 130 make this determination only for one or more cluster(s) 154 that satisfy one or more cluster size criteria 144 based on dimensions of a calibration standard 146. The cluster size criteria 144 and/or the dimensions of calibration standard 146 can be stored, for example, in the memory 132. As an illustrative example, the processor(s) 130 can determine if a cluster 154 is larger than the diameter of a circle that would circumscribe the calibration standard 120, as described in more detail below with reference to FIGS. 2-6.

In some embodiments, the processor(s) 130 can determine, based on the cluster(s) 154, boundaries 156 of a region in the point cloud that represents the calibration standard 120. For example, the processor(s) 130 can determine whether the calibration standard 120 is oriented in a horizontal/vertical direction or a diamond-shaped direction, as described in more detail below with reference to FIG. 2. Depending on the orientation of calibration standard 120, the processor(s) 130 can determine a plurality of lines, each line corresponding to a boundary of the boundaries 156 of a region in the point cloud that represents the calibration standard 120, as described in more detail below with reference to FIGS. 2-3, 9-14.

In some configurations, the processor(s) 130 determine the boundaries 156 of a region in the point cloud that represents the calibration standard 120 based on a determination that the distribution of signal intensities 142 of points satisfies one or more distribution criteria 138. A distribution of signal intensities 142 and/or the distribution criteria 138 can be stored in the memory 132. As an illustrative example, as described in more detail below with reference to FIGS. 2-3, 7-8, the processor(s) 130 can determine which, if any, areas of a region in the point cloud correspond to "black" and "white" regions of a chessboard. The processor(s) 130 can use the "black" and "white" regions to further define the boundaries 156 of the region in the point cloud that represents the calibration standard 120, as described in more detail below with reference to FIGS. 2-3, 7-8.

In some embodiments, the processor(s) 130 store data identifying a set of points 150 of the point cloud that correspond to the calibration standard 120 in one or more locations of the memory 132. In some configurations, the processor(s) 130 identify the set of points 150 based on the boundaries 156 of the region that represents the calibration standard 120.

In some embodiments, the processor(s) 130 can automatically detect the calibration standard 120 within an unstructured point cloud based at least on the instructions 134 in the memory 132. As described in more detail above, the processor(s) 130 can also use data stored in the memory 132, such as the contour metric(s) 136, the distribution criteria 138, the distance metric(s) 140, the distribution of signal intensities 142, the cluster size criteria 144, and/or the dimensions of calibration standard 146. Further, the processor(s) 130 can automatically detect the calibration standard 120 within an unstructured point cloud using data received from sensors, such as the camera 102 and/or the lidar system 112. As described in more detail below with reference to FIGS. 2-15, the processor(s) 130 can also use other data without departing from the scope of the present disclosure.

Figure 2:
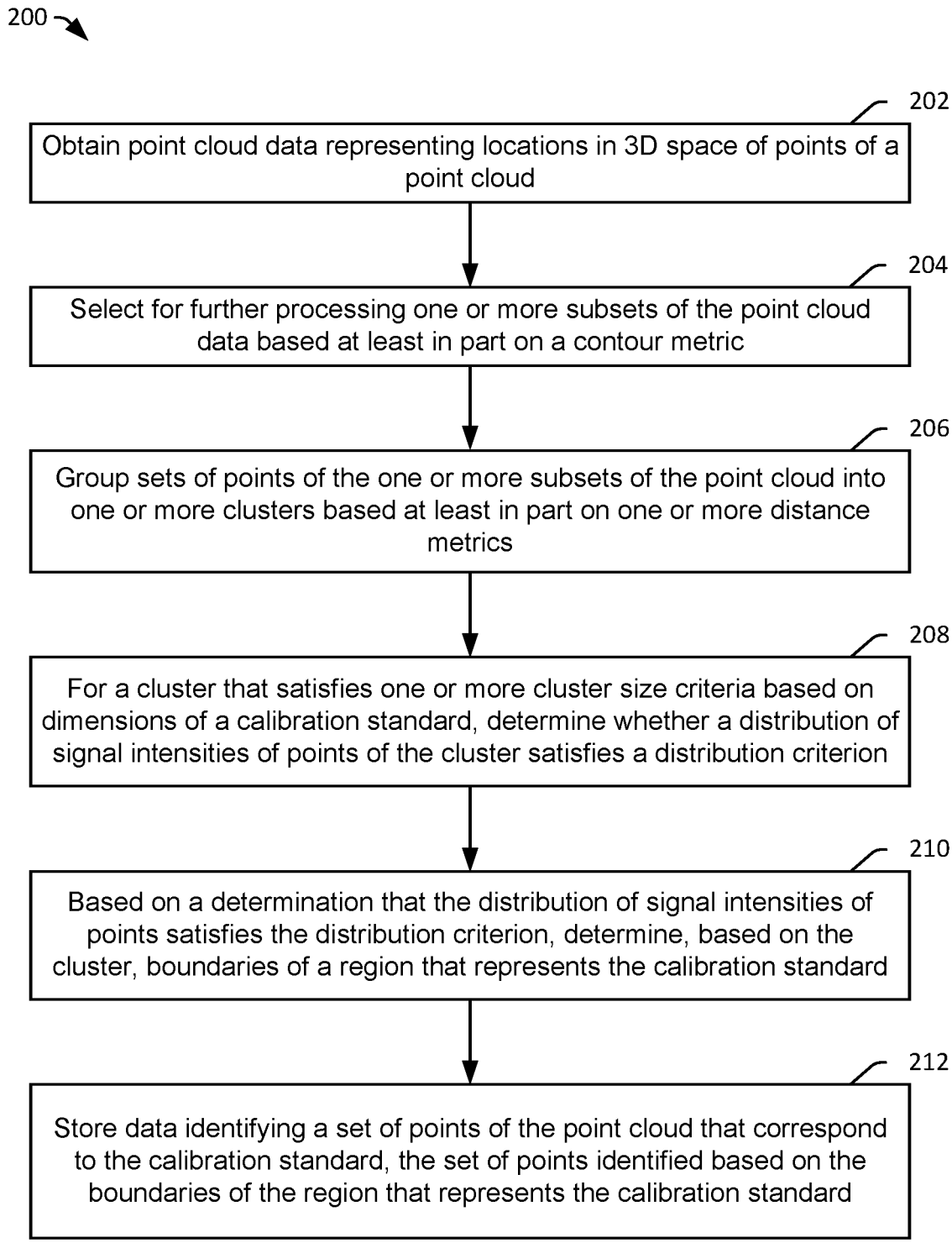
FIG. 2 is a block diagram showing an example method for automatically detecting a calibration standard in an unstructured point cloud, in accordance with at least one embodiment of the subject disclosure.

FIG. 2 is a flow chart of an example of a method 200 for automatically detecting a calibration standard in an unstructured point cloud, in accordance with at least one embodiment of the subject disclosure. The method 200 may be initiated, performed, or controlled by one or more processors executing instructions, such as by the processor(s) 130 of FIG. 1 executing the instructions 134 from the memory 132.

In some embodiments, the method 200 includes, at block 202, obtaining point cloud data representing locations in 3D space of points in a point cloud. For example, the processor(s) 130 of FIG. 1 may obtain the point cloud data 118 from the lidar system 112 or from the memory 132, as described in more detail above with reference to FIG. 1 and below with reference to FIG. 15.

In the example of FIG. 2, the method 200 also includes, at block 204, selecting for further processing one or more subsets of point cloud data based at least in part on a contour metric. For example, the processor(s) 130 can select a subset of the point cloud data 118 for further processing based on a contour metric, such as a "difference of normals" filter, as described in more detail below with reference to FIGS. 3-6.

In FIG. 2, the method 200 further includes, at block 206, grouping sets of points of the one or more subsets of the point cloud into one or more clusters based at least in part on one or more distance metrics. For example, the processor(s) 130 can group all points of the one or more subsets of the point cloud that are within a particular Euclidean distance from a plane onto which the one or more subsets of the point cloud have been projected, as described in more detail below with reference to FIGS. 3-6.

In FIG. 2, the method 200 also includes, at block 208, for a cluster that satisfies one or more cluster size criteria based on dimensions of a calibration standard, determining whether a distribution of signal intensities of points of the cluster satisfies one or more distribution criteria. For example, the processor(s) 130 of FIG. 1 can determine if a cluster is larger than the diameter of a circle that would circumscribe the calibration standard 120, as described in more detail below and with reference to FIGS. 3-6.

For a cluster that is smaller than the diameter of the circle, the processor(s) 130 can determine whether a distribution of signal intensities of points of the cluster is similar to a distribution of signal intensities that would be expected to correspond to the calibration standard 120 based on the pattern 122 of the calibration standard 120. For example, as described in more detail below with reference to FIGS. 3-4, 7-8, the processor(s) 130 of FIG. 1 can determine which, if any, areas of a region in the point cloud correspond to "black" and "white" regions of a chessboard. In this example, the processor(s) 130 of FIG. 1 uses the "black" and "white" regions to further define boundaries of the region in the point cloud that represent the calibration standard 120.

In FIG. 2, the method 200 further includes, at block 210, based on a determination that the distribution of signal intensities of points satisfies the one or more distribution criteria, determining, based on the cluster, boundaries of a region that represents the calibration standard. For example, the processor(s) 130 of FIG. 1 can determine whether the calibration standard 120 is oriented in a horizontal/vertical direction or a diamond-shaped direction, as described in more detail below with reference to FIG. 2. Depending on the orientation of the calibration standard, the processor(s) 130 of FIG. 1 can determine a plurality of lines, where each line corresponds to a boundary of a region in the point cloud that represents the calibration standard, as described in more detail below with reference to FIGS. 3-4, 9-14.

In FIG. 2, the method 200 also includes, at block 212, storing data identifying a set of points of the point cloud that correspond to the calibration standard, the set of points identified based on the boundaries of the region that represents the calibration standard, as described in more detail above with reference to FIG. 1.

Although the method 200 is illustrated as including a certain number of steps, more, fewer, and/or different steps can be included in the method 200 without departing from the scope of the present disclosure. For example, the method 200 can begin at block 204 with point cloud data representing locations in 3D space of points of a point cloud already stored in memory. As an additional example, as detailed below with reference to FIGS. 3-6, operations to select subsets of points of the point cloud for further processing (as in block 204) can, in certain embodiments, include additional steps that generally correspond to selecting for further processing one or more subsets of the point cloud data based at least in part on a contour metric. As a still further example, as detailed below with reference to FIGS. 9-14, the process of determining, based on the cluster, boundaries of a region that represents the calibration standard (as in block 210) can be different depending on a variety of factors (e.g., a known orientation of the calibration standard).

Figure 3:
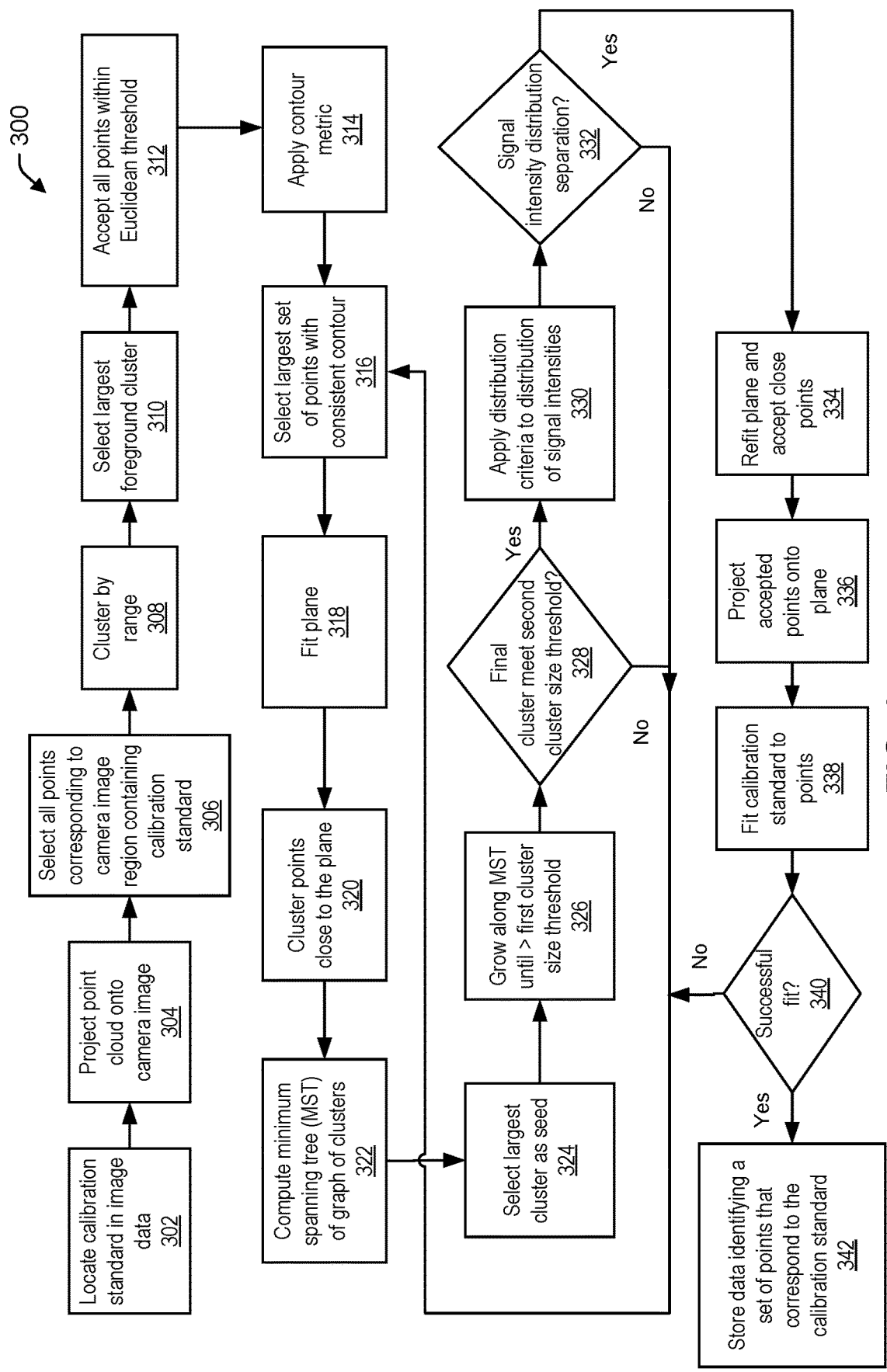
FIG. 3 is a block diagram showing another example method 300 for automatically detecting a calibration standard in an unstructured point cloud, in accordance with at least one embodiment of the subject disclosure.

FIG. 3 is a flow chart of another example of a method 300 for automatically detecting a calibration standard in an unstructured point cloud, in accordance with at least one embodiment of the subject disclosure. The method 300 may be initiated, performed, or controlled by one or more processors executing instructions, such as by the processor(s) 130 of FIG. 1 executing the instructions 134 from the memory 132.

In some embodiments, the method 300 includes, at block 302, locating the calibration standard in image data. For example, the processor(s) 130 of FIG. 1 can locate the calibration standard 120 in the image data 108. For example, image processing techniques can be used to detect pixels in the image data the correspond to the pattern 122 of the calibration standard 120.

In the example of FIG. 3, the method 300 also includes, at block 304, projecting the point cloud onto the camera image. For example, processor(s) 130 of FIG. 1 can use a pinhole camera model to project 3D points onto an image plane using a perspective transformation. The pinhole camera model can be augmented with the camera matrix and distortion vector if available.

In FIG. 3, the method 300 also includes, at block 306, selecting all points within the point cloud corresponding to the camera image region containing the calibration standard. For example, the processor(s) 130 of FIG. 1 can select all points within the point cloud corresponding to the camera image region containing the calibration standard 120 to create a buffer for further processing to process the point cloud data 118 more efficiently.

In FIG. 3, the method 300 also includes, at block 308, clustering the selected points by range, and at block 310, selecting the largest cluster in the image foreground. For example, the processor(s) 130 of FIG. 1 can generate clusters among the points selected as corresponding to the camera image region that contains the calibration standard 120. In this example, some of the selected points are likely to correspond to returns from the calibration standard 120 and others of the selected points may correspond to foreground or background objects (e.g., the ground, a stand on which the calibration standard 120 rests, etc.). Grouping the selected points into clusters by range helps to distinguish returns from other objects from returns form the calibration standard 120. The largest foreground cluster may be selected by computing the mean range and size of each cluster and then ranking the clusters by ascending distance and descending size. From the ranking, the processor(s) 130 of FIG. 1 can select the largest foreground cluster as an initial estimate of the portion of the point cloud most likely to contain the calibration standard.

In FIG. 3, the method 300 also includes, at block 312, accepting all points within a predetermined threshold distance of the selected cluster. For example, the processor(s) 130 of FIG. 1 can accept all points within a particular Euclidian distance from the selected cluster. Accepting all the points within a predetermined threshold distance of the selected cluster provides a set of data points representative of a portion of the point cloud, where the set of data points corresponds to an initial estimate of the location of the calibration standard 120 within the point cloud. The processor(s) 130 of FIG. 1 can use this initial estimate as a search space to be searched for points corresponding to the calibration standard 120 to increase the speed and efficiency of automatically detecting the calibration standard 120.

In FIG. 3, the method 300 also includes, at block 314, applying a contour metric. For example, the processor(s) 130 of FIG. 1 can filter the selected points (e.g., the largest foreground cluster, including all points within a particular Euclidean threshold) using a contour metric such as a difference of normals operator. As illustrated below with reference to FIGS. 4-6, the processor(s) 130 of FIG. 1 can apply the contour metric(s) 136 to identify regions in the point cloud with a common contour. As regions of a planar calibration standard should present as a surface with a substantially similar contour (e.g., substantially flat), the application of the contour metric(s) 136 allows for an efficient assessment of areas within the point cloud that have a consistent contour.

In FIG. 3, the method 300 also includes, at block 316, selecting the largest set of points with a consistent contour. For example, the processor(s) 130 of FIG. 1 can select the largest set of points of consistent surface normals, as described in more detail below and with reference to FIGS. 4-6.

Figure 4:
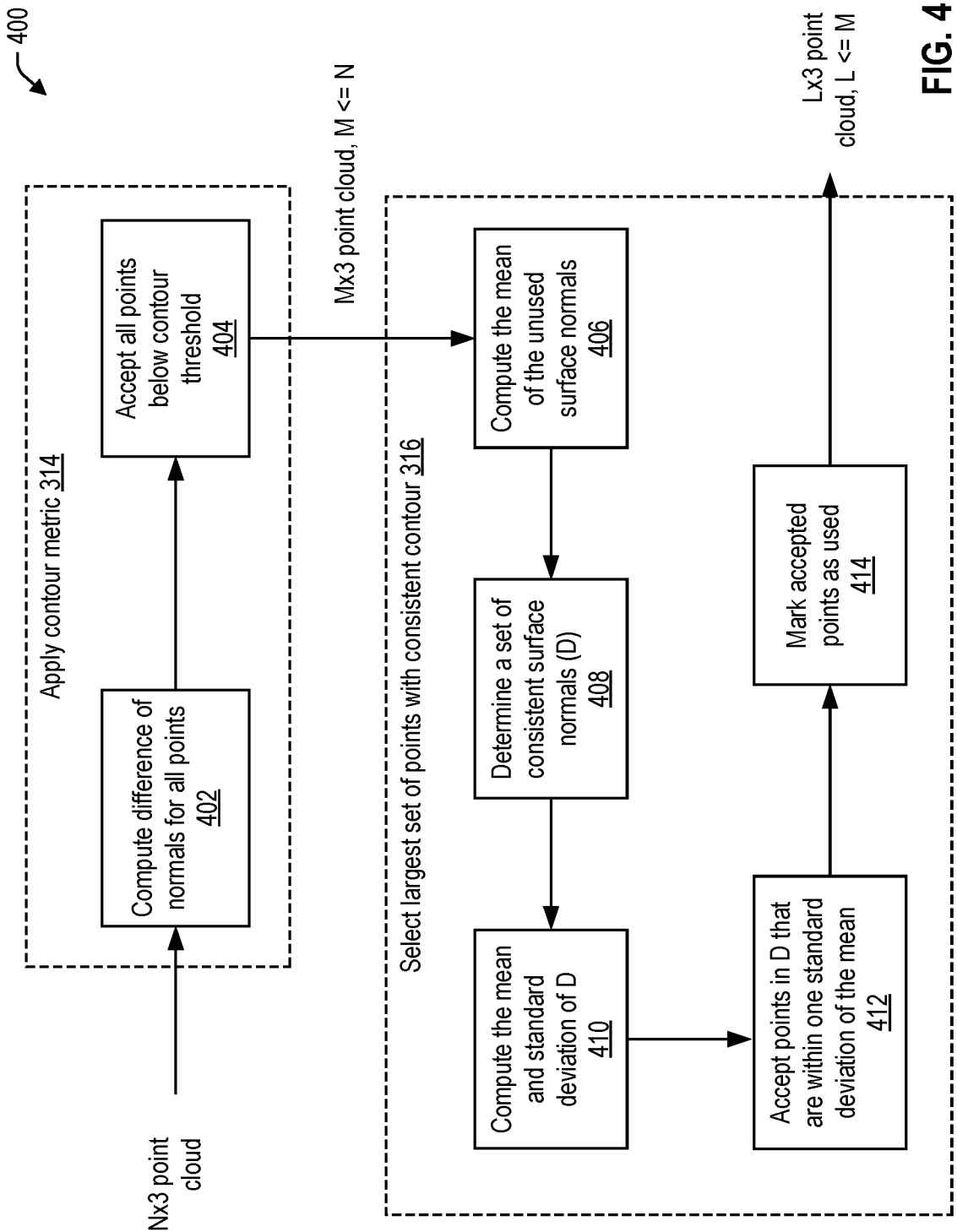
FIG. 4 is a block diagram showing an example method for applying a contour metric and selecting the largest set of points with consistent contour, in accordance with at least one embodiment of the subject disclosure.

FIG. 4 is a flow chart of an example of a method 400 for applying a contour metric and selecting the largest set of points with consistent contour, in accordance with at least one embodiment of the subject disclosure. In some implementations, the method 300 generally corresponds to blocks 314-316 of FIG. 3. One example of applying a contour metric is applying a "difference of normals" filter, as described in more detail below. One example of selecting the largest set of points with consistent contour is selecting the largest set of consistent surface normals, as described in more detail below.

In the example of FIG. 4, the method 400 includes, at block 402 computing the difference of normals for all points in the point cloud. In the same or alternative embodiments, applying a difference of normals filter includes computing the difference of normals for all points in a subset of the point cloud (e.g., the points in the selected largest foreground cluster and all points within a particular Euclidean threshold of the largest foreground cluster, as described in more detail above with reference to FIG. 3).

In some configurations, the difference of normals operator ("$\Delta_{\hat{n}}(p, r_1, r_2)$") is defined as $$\Delta_{\hat{n}}(p, r_1, r_2) = \frac{\hat{n}(p, r_1) - \hat{n}(p, r_2)}{2},$$

where $r_1, r_2 \in \mathbb{R}$, $r_1 < r_2$. In the preceding, $\Delta_{\hat{n}}$ is the difference of normals operator, "p" is a point in the point cloud, and "$r_1$" and "$r_2$" are support radii.

As an illustrative example, the processor(s) 130 of FIG. 1 can use the difference of normals operator to average the surface normals for a point (p) in the point cloud at two radii ($r_1$, $r_2$) from the point. For a given $r_1$ and $r_2$, the result of applying the difference of normals ("DoN") operator to all the points in a point cloud is a vector map where a DoN vector is assigned to each point. Since each DoN is the normalized sum of two unit normal vectors, the magnitude of the DoN vectors is within [0, 1]. Calculating the two normal maps estimated with support radii $r_1$ and $r_2$ for a calibration scene is a process that is highly parallelizable and thus benefits optimization of the processor(s) 130.

Referring again to FIG. 4, the method 400 also includes, at block 404, accepting all points that are below a particular contour threshold. For example, the processor(s) 130 of FIG. 1 can establish one or more thresholds for the contour metric(s) 136 based on the magnitude and/or the component values of the contour metric(s) 136. As illustrated in FIG. 4, applying the difference of normals filter results in a three-dimensional point cloud smaller than the initial three-dimensional point cloud (e.g., an output Mx3 point cloud from an input Nx3 point cloud, where M<=N).

In FIG. 4, the method 400 further includes, at block 316, selecting the largest set of points with consistent contour 316. In some embodiments, selecting the largest set of points with consistent contour 316 includes selecting the largest set of consistent surface normals.

In FIG. 4, the method 400 further includes, at block 406, computing the mean of the surface normals ($\bar{\mu}_{sn}$) that have not previously been identified as part of a largest set of points with consistent contour.

In FIG. 4, the method 400 further includes, at block 408, determining a set of consistent surface normals ("D"). For example, the processor(s) 130 of FIG. 1 can calculate D as $$D = \left| \frac{\hat{v}_{sn} - \bar{\mu}_{sn}}{2} \right|$$

where $\hat{v}_{sn}$ is the unit vector of the surface normal. The method 400 further includes, at block 410, computing the mean ("$\mu_D$") and standard deviation ("$\sigma_D$") for the set D. The method 400 further includes, at block 412, accepting all points in D where the points' difference of normals are within one standard deviation of the mean (e.g., $\mu_D - \sigma_D \leq D \leq \mu_D + \sigma_D$). As illustrated in FIG. 4, selecting the largest set of consistent surface normals results in a three-dimensional point cloud smaller than either the initial three-dimensional point cloud or the point cloud resulting from applying the difference of normals filter (e.g., an output Lx3 point cloud from an input Mx3 point cloud, where L<=M).

In FIG. 4, the method 400 further includes, at block 414, marking all accepted points as used. For example, the processor(s) 130 of FIG. 1 can indicate when a set of points has been processed to aid in the iterative processing in the entire point cloud by removing repeated processing of the same points. In FIG. 4, the method 400 can continue to other steps in other methods that can further process and/or analyze the data output from method 400 (e.g., the Lx3 point cloud). For example, the processor(s) 130 of FIG. 1 can output a subset of the point cloud data 152, as described in more detail below.

Figure 5:
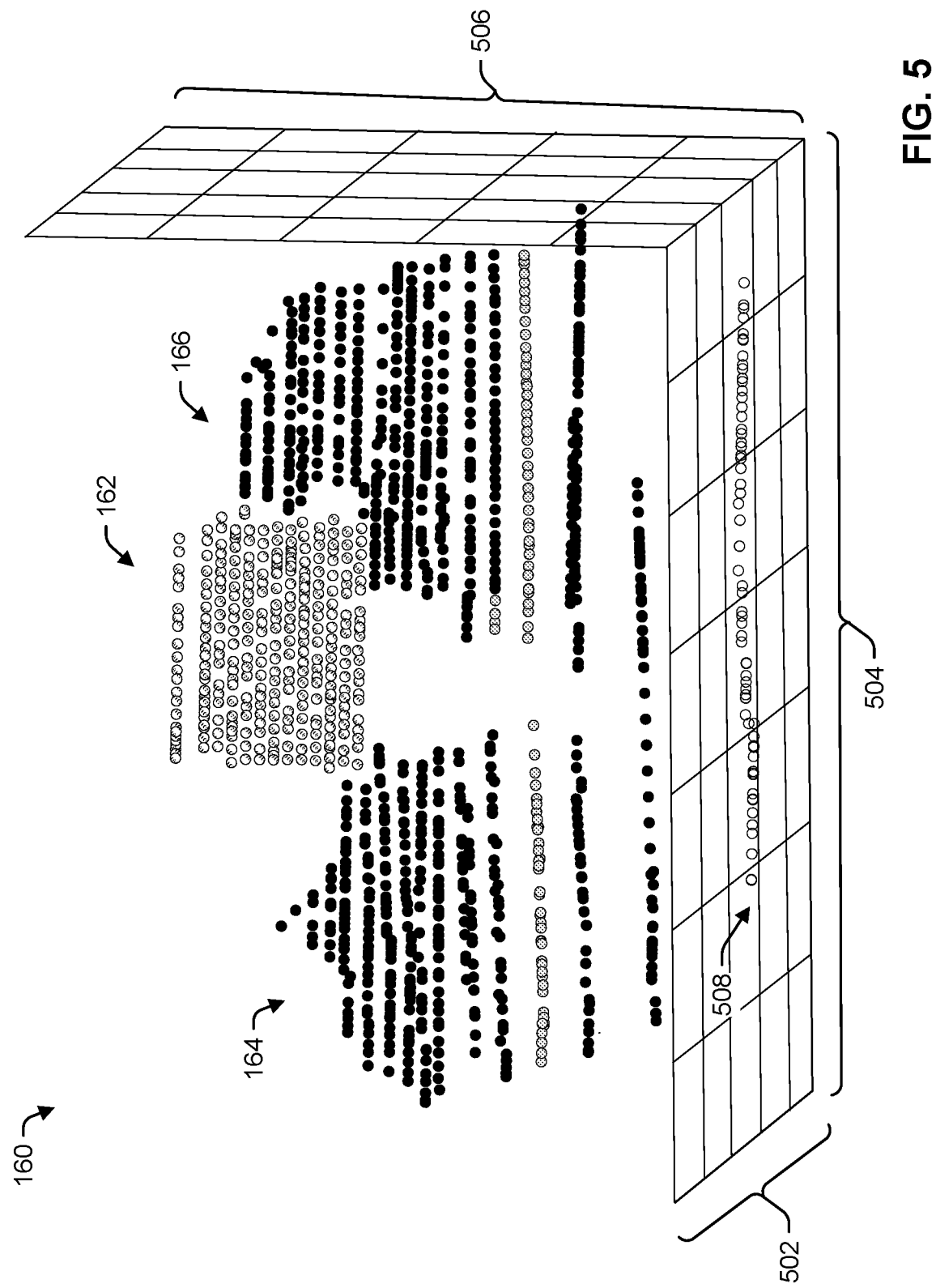
FIG. 5 is an illustrative three-dimensional graph showing exemplary output from applying a contour metric, in accordance with at least one embodiment of the subject disclosure.

FIG. 5 is an illustrative three-dimensional graph 160 showing a set of points of a point cloud disposed within a three-dimensional space 160, in accordance with at least one embodiment of the subject disclosure. FIG. 5 is provided as an illustrative example to aid in understanding and should not be understood to limit the scope of the subject disclosure. As described above with reference to FIG. 1, the point cloud includes points representing locations within the calibration scene, including a set of points 162 representing a chessboard calibration standard and a set of points 164, 166 representing other objects in the calibration scene. FIG. 5 also illustrates a set of points 508 representing a part of the calibration scene itself. In FIG. 5, the sets of points 162, 164, 166, 508 are plotted along three-dimensional axes 502, 504, 506.

As an illustrative example, the processor(s) 130 of FIG. 1 can be configured to select for further processing one or more subsets of the point cloud data 152 based at least in part on a contour metric 136 such as a DoN filter, as described in more detail above. Applying a contour metric 136 to data representative of the sets of points 162, 164, 166, and 508 can aid the processor(s) 130 of FIG. 1 in selecting the appropriate subset of the point cloud data 152.

For example, applying the contour metric 136 to set of points 508 indicates a single horizontal line, most of the points of which are reflective from flat surfaces (and thus of a consistent contour). Applying the contour metric 136 to set of points 162 indicates multiple horizontal lines, most of which are reflective from flat surfaces (and thus of a consistent contour). Applying the contour metric 136 to sets of points 164, 166 indicates multiple horizontal lines, many of which are reflective from curved, rather than flat, surfaces (and thus of inconsistent contour). In the illustrative example, the processor(s) 130 can select set of points 162 for further processing as the largest set of points with consistent contour.

As detailed above, selecting the largest set of points with a consistent contour can increase the efficiency of analyzing an unstructured point cloud. Referring again to FIG. 3, the method 300 can further include, at block 318, fitting the selected points from the point cloud to a plane. For example, the processor(s) 130 of FIG. 1 can fit the selected points to a plane using the "Random Sample Consensus" or "RANSAC" method. In FIG. 3, the method 300 also includes, at block 320, clustering any points close to the resultant fitted plane. For example, the processor(s) 130 of FIG. 1 can determine closeness to the fitted plane based at least on one or more distance metric(s) 140, including a particular Euclidean distance threshold.

In FIG. 3, the method 300 further includes, at block 322, computing a minimum spanning tree of a graph of the clusters. In some configurations, the processor(s) 130 of FIG. 1 can generate the spanning tree on a cluster basis to improve the overall efficiency of the system 100. For example, generating a minimum spanning tree on a per-cluster basis (rather than a per-point basis) requires substantially fewer computing resources. A minimum spanning tree of a graph of the subset of the point cloud data 152 is illustrated in more detail below with reference to FIG. 6.

In FIG. 3, the method 300 further includes, at block 324, selecting as a seed cluster the node from the minimum spanning tree that corresponds to the largest cluster. In some configurations, the processor(s) 130 of FIG. 1 can select the node corresponding to the largest cluster as an estimate of the cluster best representing the center of the calibration standard 120.

In FIG. 3, the method 300 further includes, at block 326, growing a cluster from the seed cluster until the grown cluster is within one or more dimension(s) of the calibration standard. For example, the processor(s) 130 of FIG. 1 can be configured to grow a seed cluster along a minimum spanning tree until a first cluster size threshold of cluster size criteria 144 is met. In some configurations, the first cluster size threshold of cluster size criteria 144 can be based on a first dimension of the calibration standard (of dimensions of calibration standard 146). For example, the first cluster size threshold can be based on a known diameter of a circle that would circumscribe the calibration standard 120. The seed cluster can grow so long as the cluster is within the predetermined diameter, as described in more detail below with reference to FIG. 6.

Growing along both directions of the minimum spanning tree identifies one or more node(s) as candidates for adding to the seed cluster. A candidate node in the minimum spanning tree is added to the seed cluster if the candidate node passes certain thresholds. In some implementations, a candidate node is added to the seed cluster if the candidate node meets certain requirements for both the size of the candidate node and the number of points in the candidate node.

For example, the processor(s) 130 of FIG. 1 can add a candidate node to the seed node only if the candidate note meets a line gate threshold and is not larger than the known diameter of a circle that circumscribes the calibration standard 120. The line gate can be used to filter a candidate note that does not include sufficient points in the node. For example, the line gate can be calculated as follows:

$$L_{Gate} = \frac{w}{2d\tan\left(\frac{\theta}{2}\right)}$$

The processor(s) 130 of FIG. 1 can, using the above equation, calculate the line gate ("$L_{Gate}$") based on the maximum expected range ("d"), the smaller dimension of the calibration standard ("W") and the azimuthal resolution of the lidar scan ("θ"). In some configurations, a threshold value for the line gate can be experimentally determined. The maximum expected range, the smaller dimension of the calibration standard, the azimuthal resolution of the lidar scan, and/or the threshold value for the line gate can be stored in memory 132, e.g., as one or more dimensions of calibration standard 146.

In addition to passing the line gate threshold, in some configurations a candidate node cannot exceed a particular size threshold (e.g., the known diameter of a circle circumscribing the calibration standard) to be added to the seed cluster. This can be used to filter a candidate node that is too large to correspond to the calibration standard. For example, if part of the lidar point cloud includes points corresponding to the front of a vehicle, a candidate node of points corresponding to the front of the vehicle can pass the line gate threshold but violate the size threshold. If the candidate node violates one or more thresholds (e.g., either the line gate threshold or the size threshold), then the candidate note is not added to the seed cluster. Growing along both directions of the minimum spanning tree using exemplary thresholds (e.g., a line gate threshold and a diameter threshold) is described in more detail below with reference to FIG. 6.

Figure 6:
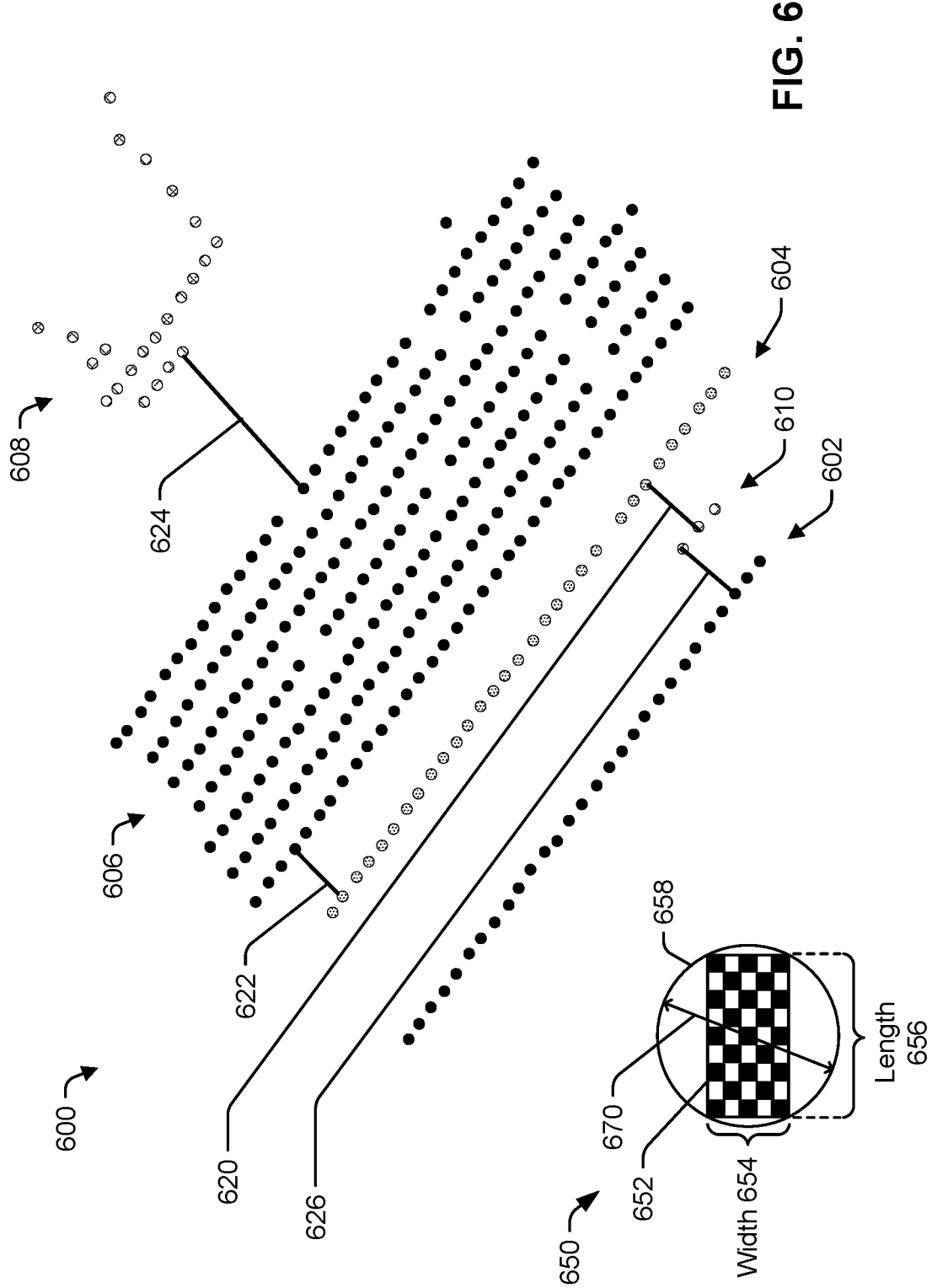
FIG. 6 illustrates an exemplary minimum spanning tree generated from a selected set of exemplary consistent surface normals, in accordance with at least one embodiment of the subject disclosure.

FIG. 6 illustrates an exemplary minimum spanning tree 600 generated from a selected subset of the point cloud data 152, in accordance with at least one embodiment of the subject disclosure. FIG. 6 is provided as an illustrative example to aid in understanding and should not be understood to limit the scope of the subject disclosure. FIG. 6 illustrates certain advantages of generating a minimum spanning tree on a per-cluster basis, as detailed above with reference to FIG. 3. The exemplary minimum spanning tree 600 includes five nodes 602, 604, 606, 608, 610, with each node 602, 604, 606, 608, 610 corresponding to a cluster of points from the point cloud. The exemplary tree 600 also illustrates an edge 626 between the nodes 602, 610; an edge 620 between the nodes 610, 604; an edge 622 between the nodes 604, 606; and an edge 624 between the nodes 606, 608. Generating the exemplary minimum spanning tree 600 can include identifying the shortest path between all the nodes 602, 604, 606, 608, 610 of the tree 600. By generating the exemplary minimum spanning tree 600 on a per-node basis rather than a per-point basis (e.g., by using a cluster of points as a node in the tree), exemplary systems and methods (e.g., system 100 of FIG. 1 and/or method 200 of FIG. 2) can more efficiently detect a calibration standard in an unstructured point cloud.

For example, the processor(s) 130 of FIG. 1 can select the node 606 corresponding to the largest cluster as the seed cluster. The processor(s) 130 of FIG. 1 can then grow the seed cluster in both directions along the minimum spanning tree 600, identifying the node 608 (along the edge 624) and the node 604 (along the edge 622) as candidate nodes to add to the seed cluster.

As described in more detail above with reference to FIG. 3, to be added to the seed cluster, a candidate node should pass one or more thresholds. For example, the candidate nodes 604, 608 would need to pass a line gate threshold and a size threshold before being added to the seed cluster. In some configurations, a size threshold can include testing whether the candidate node would grow the cluster beyond a particular size. Diagram 650 illustrates a plurality of potential size thresholds. Diagram 650 illustrates an exemplary calibration standard chessboard 652 of known width 654 and length 656. One or more of width 654 and/or length 656 can be used as a size threshold. However, width 654 and/or length 656 alone can be insufficient for a two-dimensional candidate node. In some configurations, therefore, diameter 670 of a circle 658 circumscribing exemplary calibration standard chessboard 652 can be used (e.g., by processor(s) 130 of FIG. 1) as a size threshold (e.g., in the method 300 of FIG. 3).

Referring again to the exemplary candidate nodes 604, 608, the exemplary candidate node 608 can fail an exemplary size threshold, e.g., diameter 670. For example, if the processor(s) 130 of FIG. 1 added the candidate node 608 to the node 606, the resultant cluster 154 could be larger than the diameter 670 of the circle 658 circumscribing the calibration standard 652. If the processor(s) 130 of FIG. 1 added the candidate node 604 to the node 606, the resultant cluster 154 could be smaller than the diameter 670 of the circle 658 circumscribing the calibration standard 652. Thus, the processors(s) 130 could add the candidate node 604 to the seed node 606 while rejecting the candidate node 608.

In some implementations, the processor(s) 130 of FIG. 1 could continue growing the exemplary minimum spanning tree 600, identifying the node 610 (along the edge 620) as a candidate node. As described in more detail above with reference to FIG. 3, a candidate node can also be subject to a line gate threshold. In FIG. 6, the candidate node contains only three points. The processor(s) 130 of FIG. 1 can, therefore, reject the candidate node 610 for failing an exemplary line gate threshold. In some implementations, the processor(s) 130 of FIG. 1 can continue growing the exemplary minimum spanning tree 600 in the direction of the node 610, identifying the node 602 (along the edge 626) as a candidate node. Growth in both directions from the seed node 606 can continue until all the nodes 602, 604, 606, 608, and 610 have been considered as candidates.

Using exemplary minimum spanning tree 600, the processor(s) 130 of FIG. 1 can grow a cluster 154 until a first cluster size threshold of the cluster size criteria 144 (e.g., diameter 670) is no longer violated and/or no more candidate nodes remain.

Referring again to FIG. 3, the method 300 further includes, at block 328, determining whether the cluster 154 meets a second cluster size threshold of the cluster size criteria 144. In some configurations, the second cluster size threshold of the cluster size criteria 144 can be based on a second dimension of the calibration standard of the dimensions of calibration standard 146. For example, the processor(s) 130 of FIG. 1 can determine whether the cluster 154 includes sufficient points to indicate that the cluster 154 corresponds to the calibration standard 120. In a particular implementation, the processor(s) 130 of FIG. 1 can determine whether the cluster 154 includes sufficient points by applying a coarse gate.

The coarse gate can be used to filter clusters that do not include sufficient points to be considered part of the calibration standard. For example, the physical ground can manifest as a cluster of points from the lidar point cloud. However, the ground tends to manifest as long lines rather than a dense cluster. In a particular configuration, the coarse gate can be calculated as follows:

$$C_{Gate} = \frac{hL}{2d\tan\left(\frac{\theta}{2}\right)}$$

For example, the processor(s) 130 of FIG. 1 can calculate the coarse gate ("$C_{Gate}$") using the above formula, using the expected number of beams from the lidar scan ("b"), the largest dimension of the calibration standard ("L"), and the azimuthal resolution of the lidar scan ("θ"). In some configurations, the threshold value of the coarse gate can be experimentally determined. In some implementations, the expected number of beams from the lidar scan, the largest dimension of the calibration standard, the azimuthal resolution of the lidar scan, and/or the threshold value of the coarse gate can be stored at memory 132 and/or lidar system 112.

In FIG. 3, if the cluster does not meet the second cluster size threshold, the method 300 can return to, at block 316, select the next largest set of points with consistent contour. If the cluster does meet the second cluster size threshold, the method 300 can continue to, at block 330, apply distribution criteria to a distribution of signal intensities of points of the clusters. For example, a lidar scan from lidar system 112 of FIG. 1 can return reflectivity values for each of the points in the point cloud. The reflectivity values for the entire point cloud can form a distribution of reflectivity values (an example of signal intensity). The processor(s) 130 of FIG. 1 can apply one or more distribution criteria to classify each of the points as "black," "white," or "neither."

In some implementations, the method 300 can include more, fewer, and/or different processes than those illustrated in FIG. 3. For example, the process described above with reference to blocks 302-312 can be omitted. Obtaining all points within a particular Euclidean distance of the largest foreground cluster allows for an initial estimate of the region of the point cloud in which the calibration standard 120 of FIG. 1 resides. Such an initial estimate can increase the speed and efficiency of the overall calibration process. Specifically, selecting the largest, foreground cluster of points in the point cloud for further processing can allow the processor(s) 130 of FIG. 1 to process the most likely set of points rather than the entire point cloud.

Omitting some of all of the process described with reference to blocks 302-312 can slow the calibration process by, for example, requiring the processor(s) 130 of FIG. 1 to analyze more of the point cloud data 118. Although the processor(s) 130 of FIG. 1 can use the portions of the method 300 included at one or more of blocks 302-312 to increase efficiency, in some implementations, the processor(s) 130 of FIG. 1 can automatically detect the calibration standard within an unstructured point cloud without departing from the scope of the subject disclosure.

Figure 7:
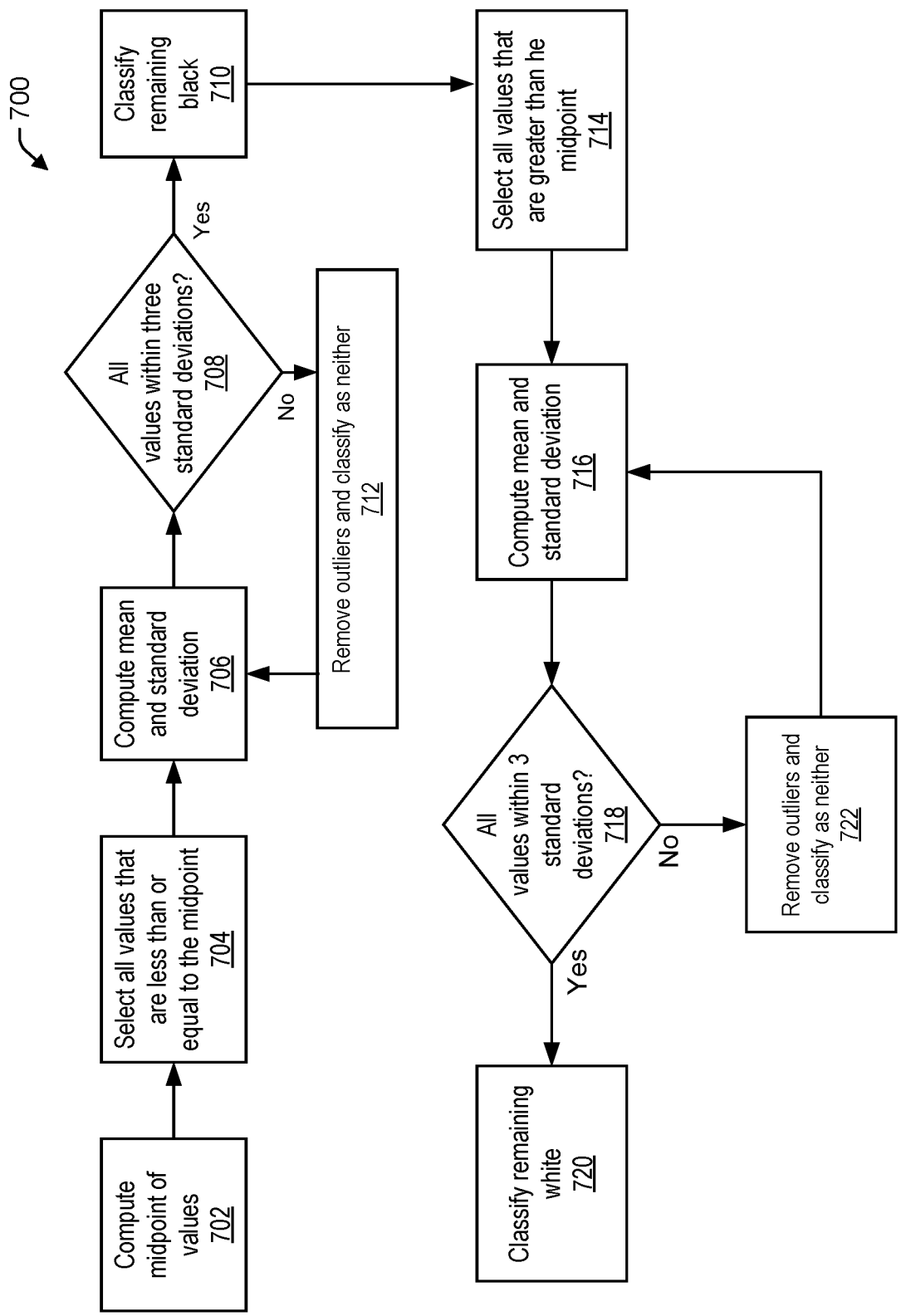
FIG. 7 is a block diagram showing an example method for applying distribution criteria to a distribution of signal intensities, in accordance with at least one embodiment of the subject disclosure.

FIG. 7 is a flow chart of an example of a method 700 for applying distribution criteria to a distribution of signal intensities, in accordance with at least one embodiment of the subject disclosure. In some implementations, the method 700 generally corresponds to block 330 of the method 300, as described in more detail above with reference to FIG. 3. In the example of FIG. 7, the method 700 receives as input data representative of a cluster of points selected from sensor output. For example, the processor(s) 130 of FIG. 1 receive a distribution of signal intensities 142 corresponding to reflectivity values associated with one or more clusters 154.

In FIG. 7, the method 700 includes, at block 702, computing a midpoint of the input values. In some implementations, reflectivity values from a lidar scan (e.g., by lidar system 112 of FIG. 1) range in value from zero to 256, with zero representing the lowest reflectivity and 256 representing the highest reflectivity. Each end of the reflectivity value range can be assigned a label. For example, values closer to zero can be designated as "black," while values closer to 256 can be designated as "white." In real-world applications, reflectivity values can be closer to arbitrary values within the reflectivity value range. One approach to accounting for this difference is to compute the midpoint of the actual reflectivity values. Values on one side of the midpoint can be designated as "white," and values on the other side of the midpoint can be designated as "black." If the classification of lidar point cloud reflectivity values is applied to points corresponding to a high-contrast calibration standard (e.g., a black-and-white chessboard), there should also be a distinct separation between the groups of points on either side of the calculated midpoint value. In some configurations, there can be a group of reflectivity values that do not belong to the designated "black" and "white" groups (e.g., points that lie within the separation region between the "black" and "white" regions). Points that correspond to reflectivity values that do not belong to the designated "black" and "white" groups can be designated as "neither."

In FIG. 7, the method 700 also includes, at block 704, selecting all the values that are less than or equal to the midpoint. For example, the processor(s) 130 of FIG. 1 can select all values in the distribution of signal intensities 142 that are less than or equal to the midpoint of the values in the distribution of signal intensities 142. In FIG. 7, the method 700 further includes, at block 706, computing the mean and standard deviation of the values that are less than or equal to the midpoint. For example, the processor(s) 130 of FIG. 1 can compute the mean and standard deviation of the values of the distribution of signal intensities 142 that are less than or equal to the midpoint.

In FIG. 7, the method 700 includes, at block 708, determining if all the values are within three standard deviations ("3σ") of the calculated mean. If all the values are not within 3σ of the mean, the method 700 includes, at block 712, removing the outliers and classifying the outliers as "neither." If all the values are within 3σ of the mean, the method 700 includes, at block 710, classifying the points as "black."

In FIG. 7, the method 700 includes, at block 714, selecting all values that are greater than the midpoint. In FIG. 7, the method 700 further includes, at block 716, computing the mean and standard deviation of the values that are greater than the midpoint.

In FIG. 7, the method 700 also includes, at block 718, determining whether all the values are within 3σ of the calculated mean. If all the values are not within 3σ of the mean, the method 700 includes, at block 722, removing the outliers and classifying the outliers as "neither." If all the values are within 3σ of the mean, the method 700 includes, at block 720, classifying the points as "white."

In some implementations, once all the points in the cluster have been classified as "white," "black," or "neither," the method 700 can output the classification values for further analysis and/or processing. For example, the processor(s) 130 of FIG. 1 can refit the plane only to the "white" and "black" points, while ignoring the "neither" points." An example of a distribution of reflectivity values is illustrated below with reference to FIG. 8.

Figure 8:
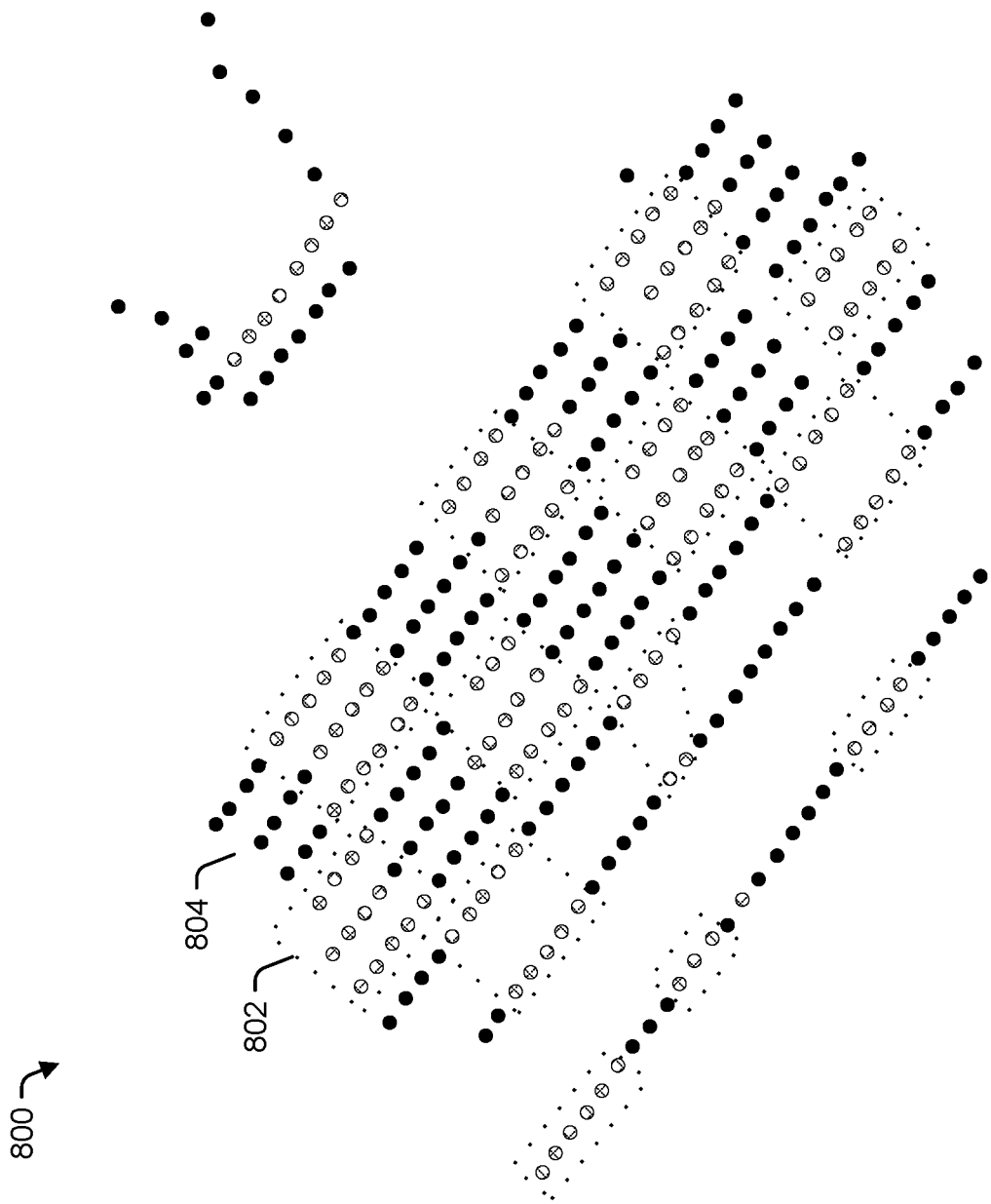
FIG. 8 illustrates an exemplary distribution of signal intensities, in accordance with at least one embodiment of the subject disclosure.

FIG. 8 illustrates an exemplary distribution of signal intensities 800, in accordance with at least one embodiment of the subject disclosure. FIG. 8 is provided as an illustrative example to aid in understanding and should not be understood to limit the scope of the subject disclosure. FIG. 8 illustrates a distribution of signal intensities 800 in a layout that generally corresponds to the exemplary minimum spanning tree 600 of FIG. 6. However, the distribution of signal intensities 800 can be analyzed in any appropriate form without departing from the scope of the subject disclosure.

The exemplary distribution of signal intensities 800 illustrates a group 802 of points that returned generally similar reflectivity values. Likewise, the distribution of signal intensities 800 illustrates a group 804 of points that returned generally similar reflectivity values. As described in more detail below with reference to FIGS. 3 and 7, applying distribution criteria to the groups 802, 804 indicates that the groups 802, 804 return reflectivity values that fall on different ends of a reflectivity value spectrum. According to the distribution criteria, the groups 802, 804 can be classified differently. For example, the processor(s) 130 of FIG. 1 can classify the group 802 as "white" and the group 804 as "black." In some implementations, the computing device(s) 110 of FIG. 1 can store the distribution of signal intensities 142 and/or the distribution criteria 138 in memory 132.

Although the method 700 and the exemplary distribution of signal intensities 800 use the terms "white," "black," and "neither" to describe exemplary distribution criteria, other terms can be used to denote and/or describe the distribution criteria 138 of FIG. 1 without departing from the scope of the present disclosure.

Referring again to FIG. 3, the method 300 further includes, at block 332, determining whether there is sufficient separation in the distribution of signal intensities. If there is not sufficient separation in the distribution of signal intensities, the method 300 includes, at block 316, selecting the next largest set of points with a consistent contour, as described in more detail above. This can occur when the initial largest foreground cluster is associated with an object that does not return sensor data with sufficient contrast. For example, if another large, flat surface (e.g., a billboard, a sign, the side of a panel van, etc.) is present in a calibration scene using a black-and-white chessboard as the calibration standard 120 of FIG. 1, the processor(s) 130 can select as the set of points corresponding to the other large, flat surface rather than the set of points corresponding to the calibration standard 120.

If there is sufficient separation between the signal intensity values, the method 300 includes, at block 334, refitting the plane of the points in the analyzed cluster. In some embodiments, the processor(s) 130 of FIG. 1 can refit the plane by re-applying the RANSAC method to the points in the analyzed cluster 154. This can be done to refine the plane to which the points had previously been fitted. When the plane was previously fitted, the method 300 applied the fitting to the largest set of points with consistent contour (and before clustering). The earlier fit can include points that most likely do not correspond to the calibration standard. Re-applying the fit at this point can allow for a better estimate of the plane to which the appropriate points belong.

In FIG. 3, the method 300 further includes, at block 336, accepting points within a particular threshold distance to the fitted plane. The method 300 further includes, at block 336, projecting the accepted points onto a two-dimensional plane. In some configurations, projecting the points into a two-dimensional plane can aid efficiency, both by increasing the processing speed of the processor(s) 130 of FIG. 1 (two-dimensional analysis is easier and faster than three-dimensional analysis) and helping to remove some of the noise from the sensor scan from the lidar system 112.

In FIG. 3, the method further includes, at block 338, fitting the dimensions of the calibration standard to the accepted points. As detailed below with reference to FIGS. 9-14, in some implementations, the processor(s) 130 of FIG. 1 can apply one or more algorithm(s) to fit the dimensions of the calibration standard 120 to a subset of the point cloud data 152. For example, the steps for fitting points from the point cloud to a vertical/horizontal-oriented chessboard can differ from the steps for fitting points from the point cloud to a diamond-oriented chessboard. As illustrative examples, FIG. 9 illustrates an example of a method 900 of fitting the points to a vertical/horizontal-oriented chessboard, while FIG. 13 illustrates an example of a method 1300 of fitting the points to a diamond-oriented chessboard.

In FIG. 3, the method 300 can include, at block 340, determining whether the final fit was successful. If the fit is not successful, the method 300 further includes, at block 316, selecting the next largest set of points with consistent contour, as described in more detail above. If the fit is successful, the method 300 further includes, at block 342, storing data identifying a set of points that correspond to the calibration standard. For example, the computing device(s) 110 of FIG. 1 can store the set of points 150 in memory 132. The method 300 can repeat some or all of the method 300 to identify a new calibration standard and/or the same calibration standard at a different time.

Figure 9:
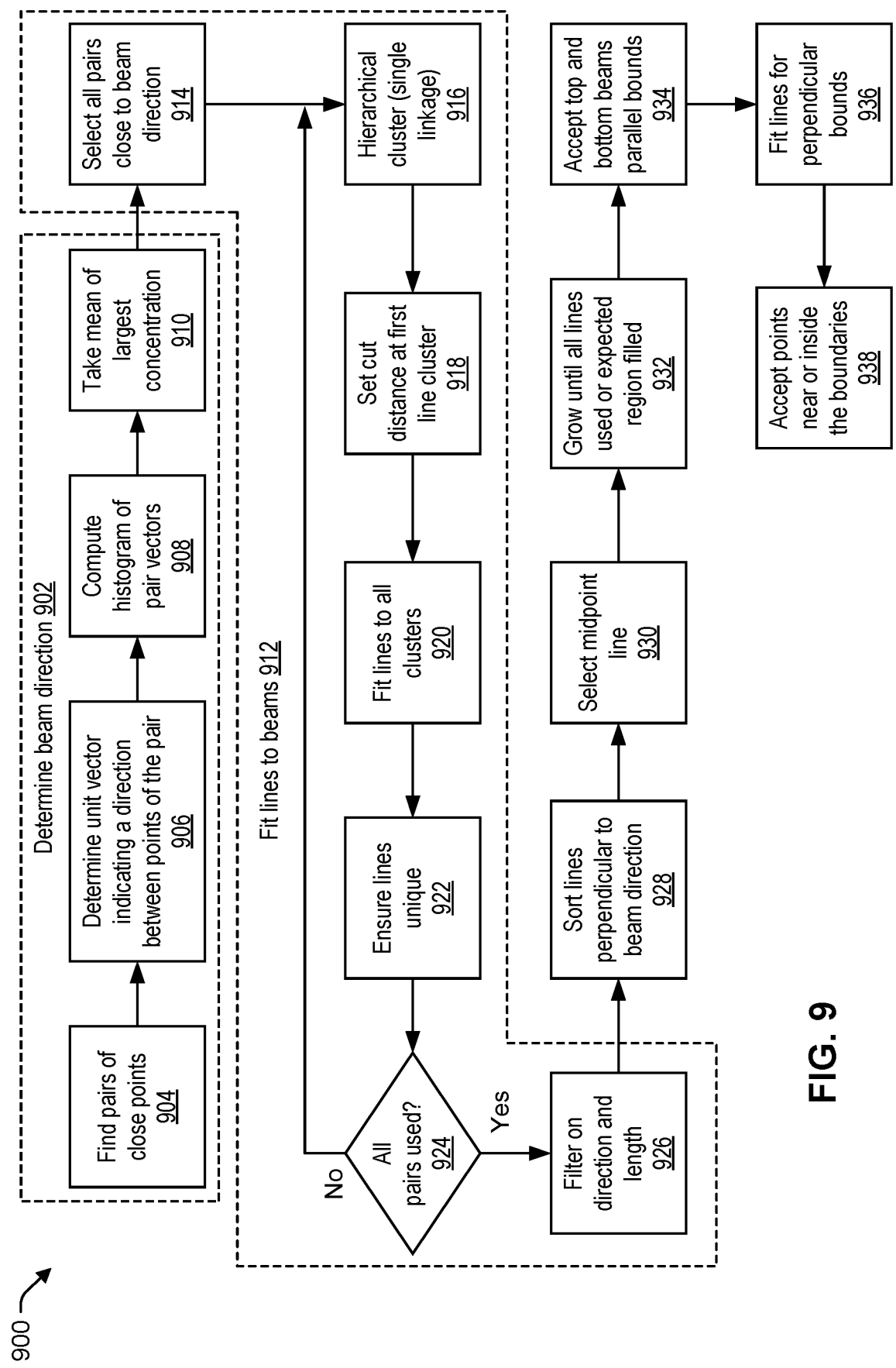
FIG. 9 is a block diagram showing an example method for fitting one or more boundaries of a calibration standard to a set of points, in accordance with at least one embodiment of the subject disclosure.

FIG. 9 is a flow chart of an example of a method 900 for fitting one or more boundaries of a calibration standard to a set of points, in accordance with at least one embodiment of the subject disclosure. For example, the processor(s) 130 of FIG. 1 can fit one or more of the boundaries 156 to the set of points 150. As detailed above with reference to FIGS. 1-3, the particular fitting algorithm chosen can depend on, among other things, the orientation of the calibration standard. For example, whether the standard is oriented in a substantially vertical/horizontal manner (as opposed to a substantially diamond-shaped manner) can determine which fitting algorithm applies. The method 900 can be used in some implementations to fit boundaries of a calibration standard for a standard in a substantially horizontal/vertical orientation. The method 1300 can be used to fit boundaries of a calibration standard for a standard in a substantially diamond-shaped orientation.

Both of the methods 900, 1300 include substantially similar preliminary steps. Specifically, the methods 900, 1300 include substantially similar steps for determining a beam direction and fitting lines to beams. Generally, the preliminary steps include establishing an appropriate reference frame for analyzing the identified points from the lidar point cloud. For example, the methods 900, 1300 first establish the "parallel" and "perpendicular" beam directions for the lidar scan. In some configurations, the parallel beam direction is based on the azimuthal-direction scan of the lidar. Certain 360-degree scanning lidars consider the 360-degree scanning direction to be the azimuth scan regardless of the physical orientation of the lidar. The elevation direction corresponds to the "perpendicular" beam direction. Elevation scan data can be added in multiple ways. For example, the lidar can include a laser that scans in a random vertical pattern. In other examples, the lidar can include multiple lasers in a fixed orientation. In real-world application, lidar can have any orientation with respect to the physical world (e.g., mounted at an angle or upside down). By establishing the analysis reference frame with respect to the parallel and perpendicular beam directions, the methods 900, 1300 can ignore the physical orientation of the sensor with respect to the physical world.

In FIG. 9, the method 900 includes, at block 904, finding all pairs of points that are within a particular Euclidean distance threshold from one another. The method 900 also includes, at block 906, creating commonly-oriented unit vectors between the pairs of close points. For the purposes of the methods 900, 1300, "commonly oriented" means that vectors with direction θ and θ+π should be considered the same.

In some configurations, the densest concentration of vector directions should correspond to the parallel beam direction. In FIG. 9, the method 900 includes, at block 908, computing the histogram of the vector directions and, at block 910, selecting the mean of the largest bin. In some implementations, computing the histogram of the vector directions and selecting the mean of the largest bin can enable the processor(s) 130 of FIG. 1 to identify the densest concentration of vector directions and thus the parallel beam direction. For example, due to the scanning nature of the lidar system 112 of FIG. 1, the azimuthal point spacing can be much denser than the elevation point spacing. Further, lidar beams from the lidar system 112 can generally manifest across the surface of certain calibration standards 120 (e.g., chessboards) as approximately straight lines. This can allow the processor(s) 130 to establish the parallel beam direction ("$\hat{v}_{para}=\langle p_x, p_y \rangle$"), where $p_x$, $p_y$ represent points between which are a unit vector direction at the mean of the largest bin of the histogram.

Once the parallel beam direction is established, the processor(s) 130 of FIG. 1 can determine the perpendicular beam direction by solving the system of equations: $\hat{v}_{perp}=\langle v_x, v_y \rangle$; $\hat{v}_{para}\hat{v}_{para}=0$; $|\hat{v}_{perp}|=1$. The solution is illustrated in the equation below:

$$\begin{cases} v_x = \dfrac{-p_x}{|\hat{v}_{para}|} \\ v_y = \dfrac{p_y}{|\hat{v}_{para}|} \end{cases}$$

In FIG. 9, the method 900 also includes, at block 912, fitting a line to each lidar beam crossing the point cluster. The method 900 can include, at block 914, selecting all the pairs of points close to the beam direction. In some configurations, the processor(s) 130 of FIG. 1 can use the histogram bin that was chosen as the parallel beam direction ("b[0]") to select an additional number of candidate bins on either side of the selected bin. For example, the processor(s) 130 of FIG. 1 can select eight additional candidate bins (four on each side of b[0]). The processor(s) 130 of FIG. 1 can further use the candidate bins from each side until the drop-off between consecutive bins on a side is beyond a particular threshold. For example, the processor(s) 130 of FIG. 1 can establish a threshold ("$T_{drop}$") such that $$T_{drop} = \max\left(\dfrac{b[-1]}{b[0]}, \dfrac{b[1]}{b[0]}\right).$$

The processor(s) 130 can accept candidate bins until the drop-off violates the threshold (e.g., when $$\dfrac{b[i]}{b[j]} < T_{drop}, i < j).$$

The processor(s) 130 can cluster all the points from the accepted bin to remove any isolated points. The processor(s) 130 can then generate a set of points to which to fit lines ("$S_{fit}$").

In FIG. 9, the method 900 includes, at block 916, clustering the points in $S_{fit}$. For example, the processor(s) 130 of FIG. 1 can generate a single linkage, hierarchical clustering of the points in $S_{fit}$. The method 900 further includes, at block 918, determining an appropriate cut distance. For example, the processor(s) 130 of FIG. 1 can find the first cluster that exceeds the line gate threshold in size, and then cut midway between this cluster and the next. Generating a cut line in this manner can better allow for non-uniform beam spacing of the relevant sensor. In the same or alternative implementations, cut lines can be generated through alternative methods that would be apparent to one of ordinary skill in the art.

In FIG. 9, the method 900 also includes, at block 920, fitting lines to the points of the cluster. In some implementations, the processor(s) 130 of FIG. 1 can use the RANSAC method to fit a line to a cluster when three or more points are available. In the same or alternative implementations, the processor(s) 130 of FIG. 1 can use a first order polynomial fit when fewer than three points are available. In some configurations, a refined line is fit in the same way to the points close to the cluster, resulting in a candidate line $p_{ci}$ and $\hat{v}_{ci}$ with associated metadata $[E_1\ M\ E_2]$, where $p_{ci}$ is a point on the $i^{th}$ candidate line, $\hat{v}_{ci}$ is the unit vector giving the direction of the line, $E_i$ are the edge points of the line (taken from $S_{fit}$) and M is the midpoint of the line.

Figure 10:
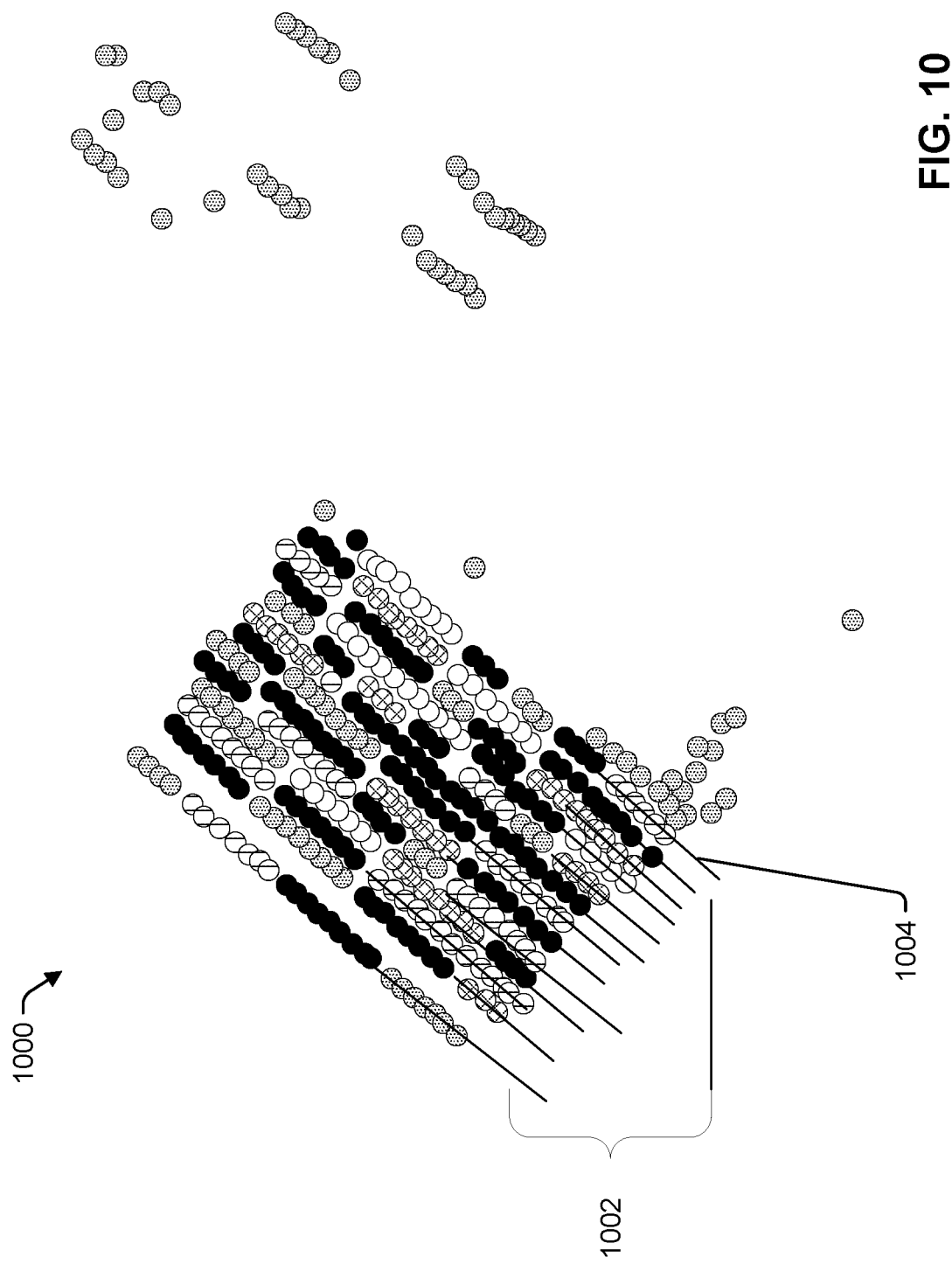
FIG. 10 illustrates an exemplary line-to-beam fitting for lines fitted to points clustered hierarchically along the beam direction, in accordance with at least one embodiment of the subject disclosure.

FIG. 10 illustrates an exemplary line-to-beam fitting 1000 for lines fitted to points clustered hierarchically along the beam direction, in accordance with at least one embodiment of the subject disclosure. Exemplary fitting 1000 is provided as an illustrative example to aid in understanding and is not intended to limit the scope of the subject disclosure. FIG. 10 illustrates a plurality of fitted lines 1002, 1004 that have been fitted to the clustered points. As illustrated in FIG. 10, the fitted lines 1002 are substantially parallel, while the fitted line 1004 is not. As described in more detail below with reference to FIGS. 9-14, the line 1004 can, in some implementations, be rejected due to lack of appropriate orientation.

Referring again to FIG. 9, the method 900 includes, at block 922, ensuring that each line is unique. In some implementations, the test for uniqueness can include two parts. For example, the processor(s) 130 of FIG. 1 first checks whether $p_{ci}$ falls near a line in a unique set ("$S_{lines}$"). If it does, the processor(s) 130 can eliminate $p_{ci}$ because the candidate line is either too similar to the unique set or a cross beam line. In some configurations, the processors(s) perform this proximity test by computing $T_{line}=(p_{ci}-p_{uj})\times\hat{v}_{uj}$, $\forall$ i∈candidate set, $\forall$ j∈unique set. If $T_{line}<T_{thresh}$, where $T_{thresh}$ is a particular threshold value, then the candidate line falls too near a line in the unique set and the processor(s) 130 can reject the candidate line. The processor(s) 130 can also perform a second check of whether $\hat{v}_{ci}$ is parallel with a line in the unique set. In some configurations, the processor(s) 130 can perform this parallel test by computing $T_{para}=\hat{v}_{ci}\times\hat{v}_{uj}$, $\forall$ i∈candidate set, $\forall$ j∈unique set. If $T_{para}<T_{thresh}$, then the candidate line is insufficiently parallel to a line in the unique set and the processor(s) 130 can reject the candidate line.

Although each beam can appear visually parallel, there can be sufficient variation in direction to reject lines as insufficiently parallel. For example, referring again to FIG. 10, any of the lines 1002 can generate $T_{para}<T_{thresh}$, while line 1004 can generate $T_{para}>T_{thresh}$ Thus, for example, the processor(s) 130 of FIG. 1 would pass lines 1002 under the second uniqueness check and reject line 1004 under the second uniqueness check.

Referring again to FIG. 9, if a candidate line is considered unique, the processor(s) 130 of FIG. 1 can add the candidate line to the unique set, $S_{lines}$. Additionally, in some implementations, the processors(s) 130 can mark all points close to the candidate line as used. In some configurations, the processor(s) can use one or more threshold(s) to determine whether a point is close to a candidate line. As an illustrative example, determining whether a point should be included in $S_{used}$ can include two separate thresholds. Multiple thresholds can be used depending on real-world considerations of the particular sensor pair being calibrated. For example, the VLP32-C lidar has non-uniform beam spacing. The VLP32-C is manufactured by Velodyne™ LiDAR (Velodyne is a registered trademark of Velodyne LiDAR, Inc. of San Jose Calif., USA).

In areas where the beam density is very high, the method 900 can fit lines that span multiple lidar beams but are still close enough to the parallel direction to be accepted. In such a configuration, the method 900 can choose between using a "loose" threshold or a "tight" threshold to prevent large gaps between segments of points used to fit the line. To determine which threshold to use, the method 900 can first project all the points passing the loose threshold onto the line, noting that $P_{tight}\subset P_{loose}$, and determine which points also pass the tight threshold. The method 900 can (e.g., by processor(s) 130 of FIG. 1) also determine an exemplary threshold, $T_\sigma$=max (std($P_{tight}$), std($P_{loose}$)) and sum all gaps that are greater than $T_\sigma$ for both $P_{loose}$ and $P_{tight}$. In a particular implementation, the method 900 can use the tight threshold whenever $G_{tight}<2*G_{loose}$, where $G_{tight}=\Sigma P_{tight}$ $\forall$ $P_{tight}>T_\sigma$ and $G_{loose}=\Sigma P_{loose}$ $\forall$ $P_{loose}>T_\sigma$. Otherwise, the method 900 can use the loose threshold.

In FIG. 9, the method 900 can include, at block 924, determining whether all pairs of points have been used. If not all the pairs have been used, the method 900 can include, at block 914, re-clustering the pairs close to the beam direction. If all the pairs of points have been used, the method 900 includes, at block 926, filtering lines that are too far from the parallel beam direction and too short for membership in the calibration standard region. For example, the processor(s) 130 of FIG. 1 can, for each line, calculate coordinates in a new measurement space. For example, the processor(s) 130 can, for each line "uj" in a set of lines "u," calculate coordinates comprising (1) a difference ("$\Delta\theta$") between the orientation of the beam direction ("$\hat{v}_{beam}$") and the line's orientation ("$\hat{v}_{uj}$"); and (2) a difference ("$\Delta L$") between the line's length ("$L_{uj}$") and the median of all line lengths ("$L_u$"). In a particular configuration, the processor(s) 130 can calculate the coordinates according to the following equations:

$$\Delta\theta=|\sin^{-1}(\hat{v}_{beam}\times\hat{v}_{uj})|$$

$$\Delta L=|L_{uj}-\mathrm{median}(L_u)|$$

In some configurations, the processor(s) 130 of FIG. 1 can calculate line lengths (e.g., $L_u$, $L_{uj}$) based on the endpoints of the lines "uj" in the set of lines "u." As described in more detail above, metadata associated with each line can include the line's endpoints and midpoint. In some implementations, the metadata can be stored at memory 132.

Figure 11:
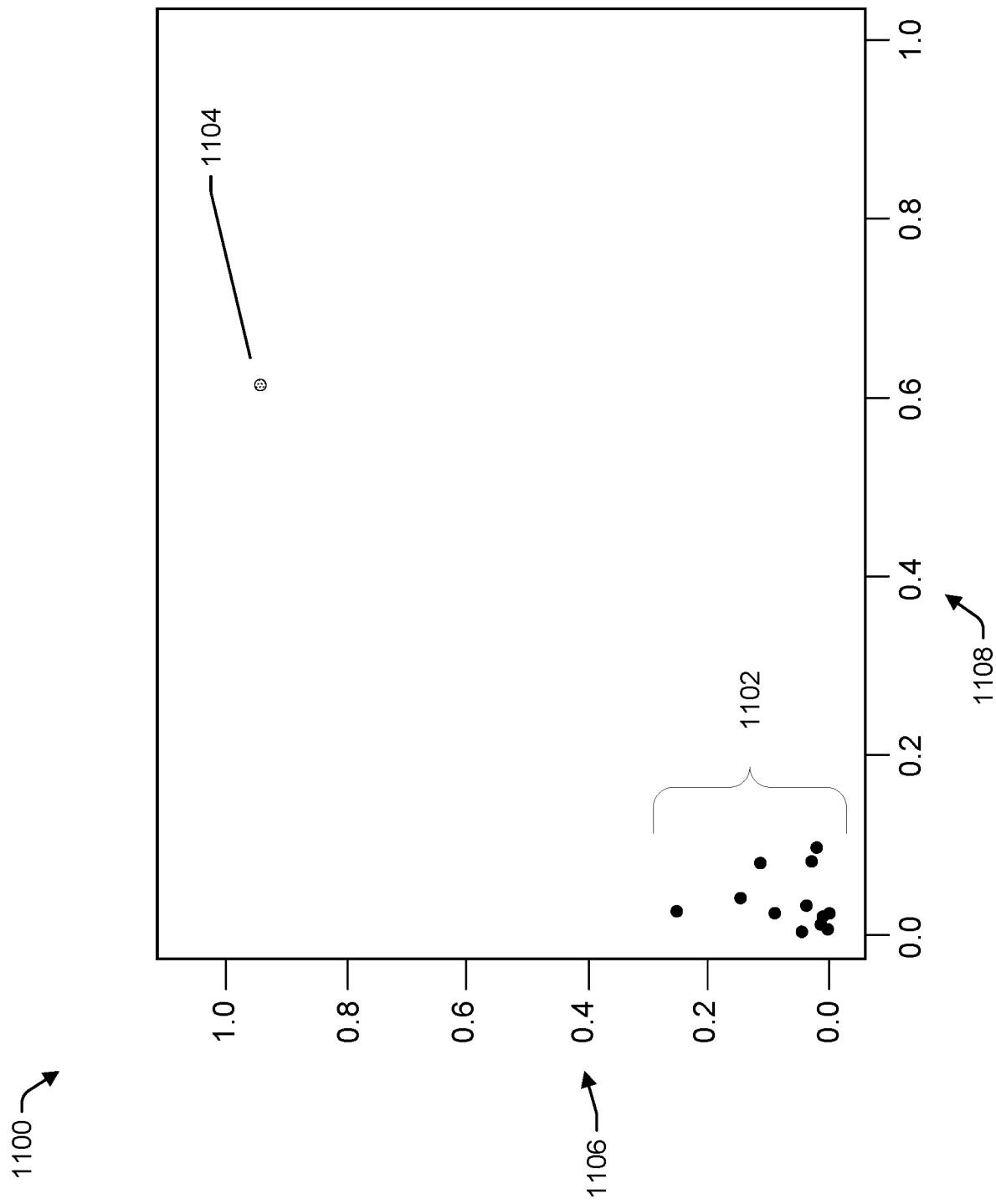
FIG. 11 illustrates an exemplary plotting of coordinates associated with fitted lines, in accordance with at least one embodiment of the subject disclosure.

In the new measurement space, the origin point (i.e., (0,0)) can represent an ideal value. In some embodiments, the method 900 can include, at block 926, rejecting any line(s) whose distance from the ideal is beyond a predetermined threshold. For example, the processor(s) 130 of FIG. 1 can reject any line whose distance from the origin is greater than one. FIG. 11 below illustrates an exemplary plotting of fitted lines (e.g., lines 1002, 1004 of FIG. 10) within this measurement space.

FIG. 11 illustrates an exemplary plotting 1100 of coordinates associated with fitted lines, in accordance with at least one embodiment of the subject disclosure. Exemplary plotting 1100 is provided as an illustrative example to aid in understanding and is not intended to limit the scope of the subject disclosure. Exemplary plotting 1100 includes a plurality of points 1102 and 1104 plotted according to the coordinates described in more detail above with reference to FIG. 10. For example, the plurality of points 1102 and 1004 generally correspond to the lines 1002 and 1004 of FIG. 10, respectively. Each of the lines 1002 and 1004 can have coordinates corresponding to each line's respective $\Delta\theta$ and $\Delta L$ values. FIG. 11 illustrates each of the plurality of points 1102 and 1004 plotted according to its $\Delta\theta$ and $\Delta L$ coordinates, where the axis 1108 corresponds to a range of $\Delta\theta$ values and the axis 1106 corresponds to a range of $\Delta L$ values. As both the $\Delta\theta$ and $\Delta L$ values are normalized, the range of $\Delta\theta$ and $\Delta L$ values fall between zero and one. After plotting, each of the points 1102 and 1104 has a respective Euclidean distance from the origin of exemplary plotting 1100.

In FIG. 11, the plurality of points 1102 are generally associated with the lines 1002 of FIG. 10, and the point 1104 is generally associated with the line 1004 of FIG. 10. As described in more detail above with reference to FIGS. 9-10, the lines 1002 pass a direction and/or length filter, while the line 1004 fails a direction and/or length filter. In FIG. 11, the point 1104 is notably farther from the origin point of the plotting 1100 than the points 1102. As noted above, if one or more of the points 1102 and 1104 are at a distance from the origin that is greater than a particular threshold (e.g., one), then the line corresponding to the points 1102 and 1104 can be filtered out.

Referring again to FIG. 9, the method 900 also includes, at block 928, sorting the lines that are perpendicular to the beam direction. In some implementations, the processor(s) 130 of FIG. 1 can sort all the lines in $S_{lines}$ along the perpendicular beam direction by projecting the midpoint of each line onto $\hat{v}_{perp}$. This can enable the processor(s) 130 to sort the lines by distance to generate a defined top and bottom. In FIG. 9, the method 900 also includes, at block 930, selecting a midpoint line as a seed line for growing the region corresponding to the calibration standard. In some implementations, this selection can include selecting the line corresponding to the median of the projected lines. Generally, selecting the seed line in this manner allows for growth of the region corresponding to the calibration standard to begin approximately in the middle of the region.

Figure 12:
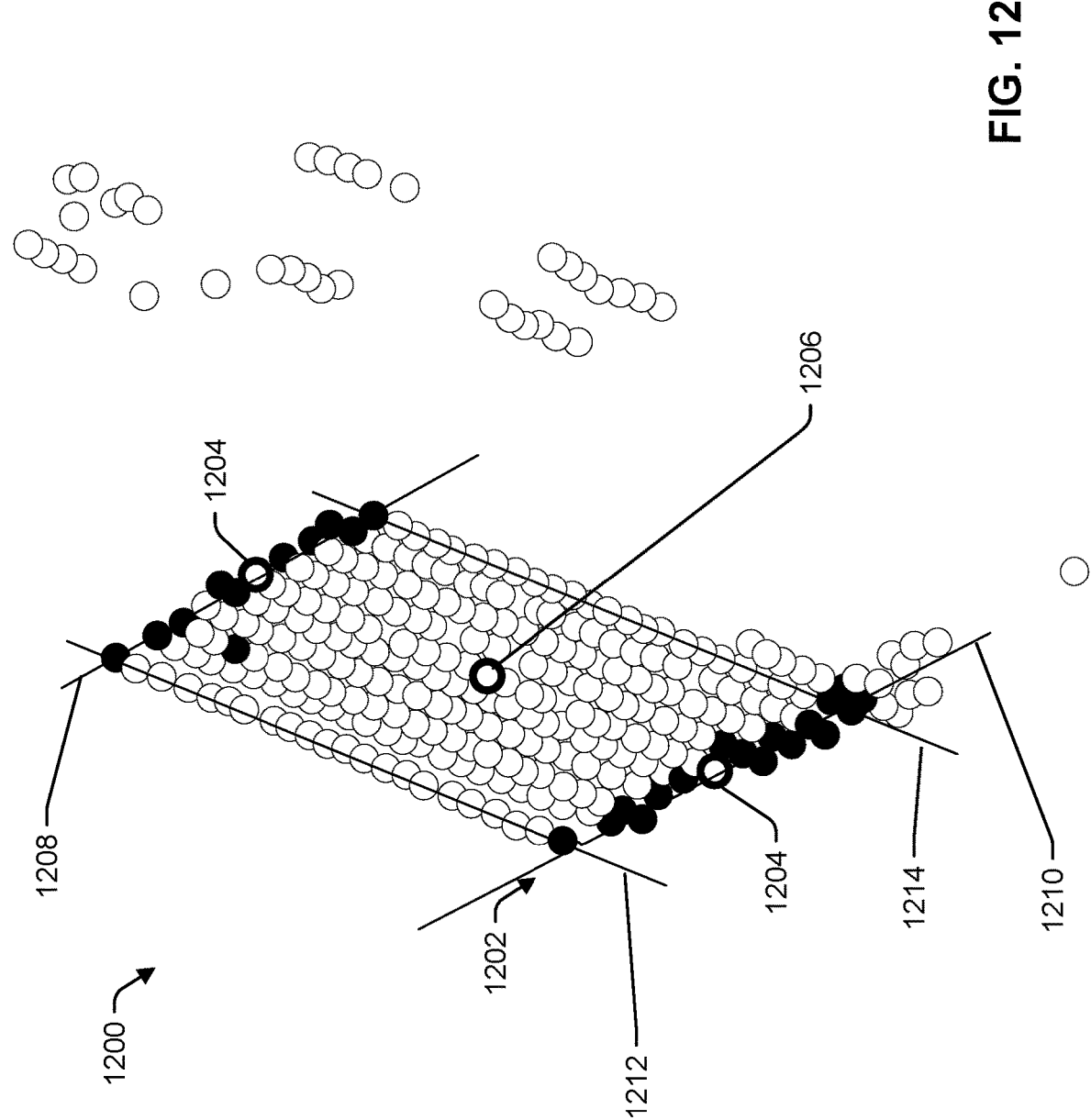
FIG. 12 illustrates an exemplary cluster with lines fitted to the points of the cluster, in accordance with at least one embodiment of the subject disclosure.
Figure 13:
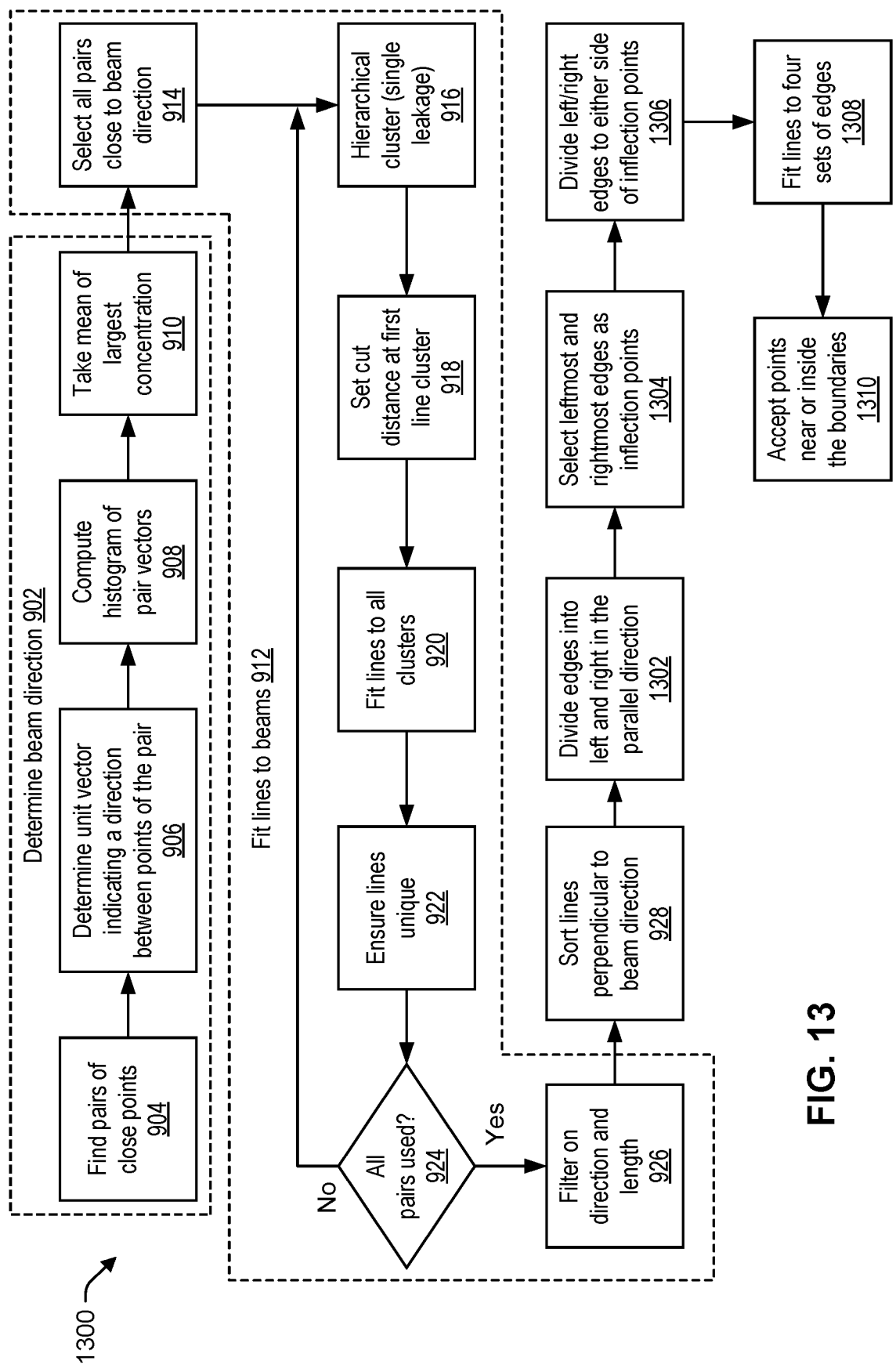
FIG. 13 is a block diagram showing another example method for fitting one or more boundaries of a calibration standard to a set of points, in accordance with at least one embodiment of the subject disclosure.

FIG. 12 illustrates an exemplary cluster 1200 with lines fitted to the points of the cluster, in accordance with at least one embodiment of the subject disclosure. Exemplary cluster 1200 is provided as an illustrative example to aid in understanding and is not intended to limit the scope of the subject disclosure. Exemplary cluster 1200 illustrates the identified standard region corresponding to the selected set of points as described in more detail above with reference to FIGS. 3-11, as well as the standard region described in more detail below with reference to FIGS. 13-14.

Exemplary cluster 1200 illustrates a number of candidate line endpoints 1202. Each of the candidate line endpoints 1202 corresponds to an endpoint of a candidate line, as described in more detail above with reference to FIG. 9. Additionally, exemplary cluster 1200 illustrates seed line endpoints 1204. Seed line endpoints correspond to the endpoints of the candidate line that was selected as the midpoint line, as described in more detail above with reference to block 924 of FIG. 9. Further, exemplary cluster 1200 illustrates seed line midpoint 1206. Seed line midpoint 1206 generally corresponds to the midpoint of the candidate line that was selected as the midpoint line, as described in more detail above with reference to block 930 of FIG. 9.

Exemplary cluster 1200 illustrates a candidate line (e.g., the line defined by endpoints 1204 and midpoint 1206) that has been selected as the seed line for growing the identified standard region. As illustrated, the seed line is approximately in the middle of the standard region. Referring again to FIG. 9, the method 900 includes, at block 932, growing from the seed line until all candidate lines have been used or the expected dimensions of the standard have been filled. In some implementations, the processor(s) 130 of FIG. 1 can iteratively grow from the seed line in both directions along $\hat{v}_{perp}$, the perpendicular beam direction. For example, at each iteration, the processor(s) 130 of FIG. 1 can select the growth direction by determining the next candidate line whose length is closest to the current mean length of all lines in the standard region. If the next lines in both directions are significantly different from the mean line length, the processor(s) 130 can skip the line and continue with the next line (if available) as the candidate growth direction.

After determining the growth direction, the processor(s) 130 of FIG. 1 can determine whether including a candidate line grows the standard region beyond the known boundaries of the standard. For example, the processor(s) 130 can determine whether including a candidate line grows beyond the known diameter of the circle that circumscribes the calibration standard (e.g., diameter 670 of FIG. 6) as well as the standard's known length and/or width (e.g., length 656 and/or width 654 of FIG. 6). If the candidate line fits within the dimensional constraints, the processor(s) 130 of FIG. 1 can ensure that all points in the cluster are accounted for. For example, the processor(s) 130 can determine if all points in the cluster are contained in $S_{used}$. If there are no missing points, the processor(s) 130 can include the candidate line and can incorporate the candidate line's length into the mean line length.

Referring again to FIG. 9, the method 900 includes, at block 934, establishing the top and bottom boundaries of the cluster. In some implementations, the processor(s) 130 of FIG. 1 can establish the top and bottom boundaries 156 of a cluster 154 by identifying the two accepted candidate lines that are the farthest from the seed line in each direction along the perpendicular beam direction ($\hat{v}_{perp}$) In FIG. 9, the method 900 further includes, at block 936, fitting lines for perpendicular bounds. For example, to fully identify the cluster 154 as corresponding to the calibration standard 120, the processor(s) 130 can also identify the boundary lines of boundaries 156 along the parallel beam direction ($\hat{v}_{para}$).

In some implementations, identifying the boundary lines along the parallel beam direction includes dividing all the accepted edge points (e.g., all the points along the top and bottom boundary lines) into "left half" and "right half" edges with respect to the parallel beam direction. In some embodiments, it can be sufficient to determine the separate groupings rather than identifying the left and right halves. In some configurations, the processor(s) 130 of FIG. 1 can determine the left half and right half groupings by selecting a random edge ("$E_{rand}$") and computing the distance to all other edges, as shown in the equations below:

$$E_{side1} = \min_{cois}(|E_{rand} - [E_1 E_2]|)$$

$$E_{side2} = \{E_1, E_2\} \backslash E_{side1}$$

In the above equations, "$E_1$" and "$E_2$" correspond to the endpoints of a candidate line, and "Side 1" and "Side 2" correspond to a first vertical side and a second vertical side, respectively. For example, in some configurations, "Side 1"

can correspond to a "left" vertical side, while in other configurations, "Side 2" can correspond to a "right" vertical side.

The processor(s) 130 of FIG. 1 can fit a series of lines to the left half edges using a strategy similar to that described in more detail above with reference to blocks 914-926 of FIG. 9. This strategy can include selecting the line within the cluster 154 with the best combination of (1) matching the perpendicular beam direction and (2) fitting the most edge points of the bottom boundary line. The processor(s) 130 of FIG. 1 can accept the line best meeting these two criteria as a third boundary line. A similar procedure performed on the right half can yield the final boundary line. Collectively, these four boundary lines can define a region in the point cloud in which the calibration standard 120 resides.

Referring again to FIG. 12, exemplary cluster 1220 illustrates the lines 1208, 1210, 1212, 1214 that have been accepted as the boundaries for the standard region. In FIG. 12, the cluster 1220 has a top (or first) boundary line 1208, a bottom (or second) boundary line 1210, a left (or third) boundary line 1212, and a right (or fourth) boundary line 1214. The combination of the boundary lines 1208, 1210, 1212, 1214 provide a bounding quadrilateral for the region in the point cloud in which the calibration standard resides.

Referring again to FIG. 9, the method 900 further includes, at block 938, accepting all points near or inside the boundaries defined by the boundary lines. For example, the processor(s) 130 of FIG. 1 can accept all points near or inside the bounding quadrilateral provided by the boundary lines 1208, 1210, 1212, 1214 of FIG. 12. In some configurations, the processor(s) 130 of FIG. 1 can identify points as near the boundary lines 1208, 1210, 1212, 1214 of FIG. 12 by identifying points that are within a predetermined Euclidian distance from each of the boundary lines 1208, 1210, 1212, 1214. In some configurations the processor(s) 130 of FIG. 1 can also identify the set of points 150 that are near or inside the bounding quadrilateral. In some implementations, the boundary lines 1208, 1210, 1212, 1214 and/or the set of points 150 can be stored at memory 132 of FIG. 1.

Although the method 900, the exemplary line-to-beam fitting 1000, the exemplary plotting 1100, and the exemplary cluster 1200 use the terms "left" and "right" to describe grouping of points, other terms can be used to denote and/or describe the groupings of points, clusters, lines, endpoints, edges, boundary lines, etc. without departing from the scope of the present disclosure.

FIG. 13 is a flow chart of an example of another method 1300 for fitting one or more boundaries of a calibration standard to a set of points, in accordance with at least one embodiment of the subject disclosure. As detailed above with reference to FIG. 6, the particular fitting algorithm chosen can depend on, among other things, the orientation of the calibration standard. For example, whether the standard is oriented in a substantially vertical/horizontal manner (as opposed to a substantially diamond-shaped manner) can determine which fitting algorithm applies. The method 900 can be used to fit boundaries of a calibration standard in a substantially horizontal/vertical orientation. The method 1300 can be used to fit boundaries of a calibration standard in a substantially diamond-shaped orientation.

Both the methods 900, 1300 include substantially similar preliminary steps. Generally, the preliminary steps include establishing an appropriate reference frame for analyzing the identified points from the lidar point cloud. For example, the method 1300 includes, at blocks 902-926, a process substantially similar to the process described in more detail above with reference to FIG. 9.

In FIG. 13, the method 1300 also includes, at block 928, sorting the lines that are perpendicular to the beam direction. For example, the processor(s) 130 of FIG. 1 can sort all the lines in $S_{lines}$ along the perpendicular beam direction by projecting the midpoint of each line onto $\hat{v}_{perp}$. This can enable dividing the edges into "left half" and "right half" clusters with respect to the parallel beam direction. In FIG. 13, the method 1300 includes, at block 1302, dividing the edges into left and right in the parallel direction. In some implementations, the processor(s) 130 of FIG. 13 can divide the edges into left and right halves by first establishing left and right edges. In a particular implementation, the processor(s) 130 can identify the "left half" edges ("$E_{left}$") and the "right half" edges ("$E_{right}$") using the formulas below:

$$E_{left} = \min(\text{Proj}_{E_{11}}, \text{Proj}_{E_{21}}) \forall E \in (E_1, E_2)$$

$$E_{right} = \max(\text{Proj}_{E_{11}}, \text{Proj}_{E_{21}}) \forall E \in (E_1, E_2)$$

In FIG. 13, the method 1300 also includes, at block 1304, selecting left and right inflection points. In a particular implementation, the processor(s) 130 of FIG. 1 can find the left inflection point ($I_{left}$) by calculating $I_{left} = \min(\text{Proj}_{E_{left}})$ $\forall E \in \{E_{left}\}$. Similarly, the processor(s) 130 can find the right inflection point ($I_{right}$) by calculating $I_{right} = \min(\text{Proj}_{E_{right}})$ $\forall E \in \{E_{right}\}$. The method 1300 further includes, at block 1306, dividing the "left half" edges of the cluster into a first group on one side of the left inflection point and a second group on the other side of the left inflection point. The method 1300 also includes, at block 1306, dividing the "right half" edge of the cluster into a first group on one side of the right inflection point and a second group on the other side of the right inflection point.

In FIG. 13, the method 1300 also includes, at block 1308, fitting lines to four sets of edges. In some implementations, the processor(s) 130 of FIG. 1 can fit lines to four sets of edges according to the left and right inflection points. For example, the processor(s) 130 can calculate the sets of endpoints corresponding to each of the four sides ("$S_1$", "$S_2$", "$S_3$", "$S_4$") according to the following formulas:

$$S_1 = \{E_{left} : \text{Proj}_{E_{left}} \leq \text{Proj}_{I_{left}}\}$$

$$S_2 = \{E_{left} : \text{Proj}_{E_{left}} \geq \text{Proj}_{I_{left}}\}$$

$$S_3 = \{E_{right} : \text{Proj}_{E_{right}} \leq \text{Proj}_{I_{right}}\}$$

$$S_4 = \{E_{right} : \text{Proj}_{E_{right}} \geq \text{Proj}_{I_{right}}\}$$

Identifying the sets of endpoints corresponding to each of the four sides can allow the processor(s) 130 to fit lines to each set of endpoints, therefore identifying the sides of a bounding quadrilateral for the cluster 154, as described in more detail below with reference to block 1308.

Figure 14:
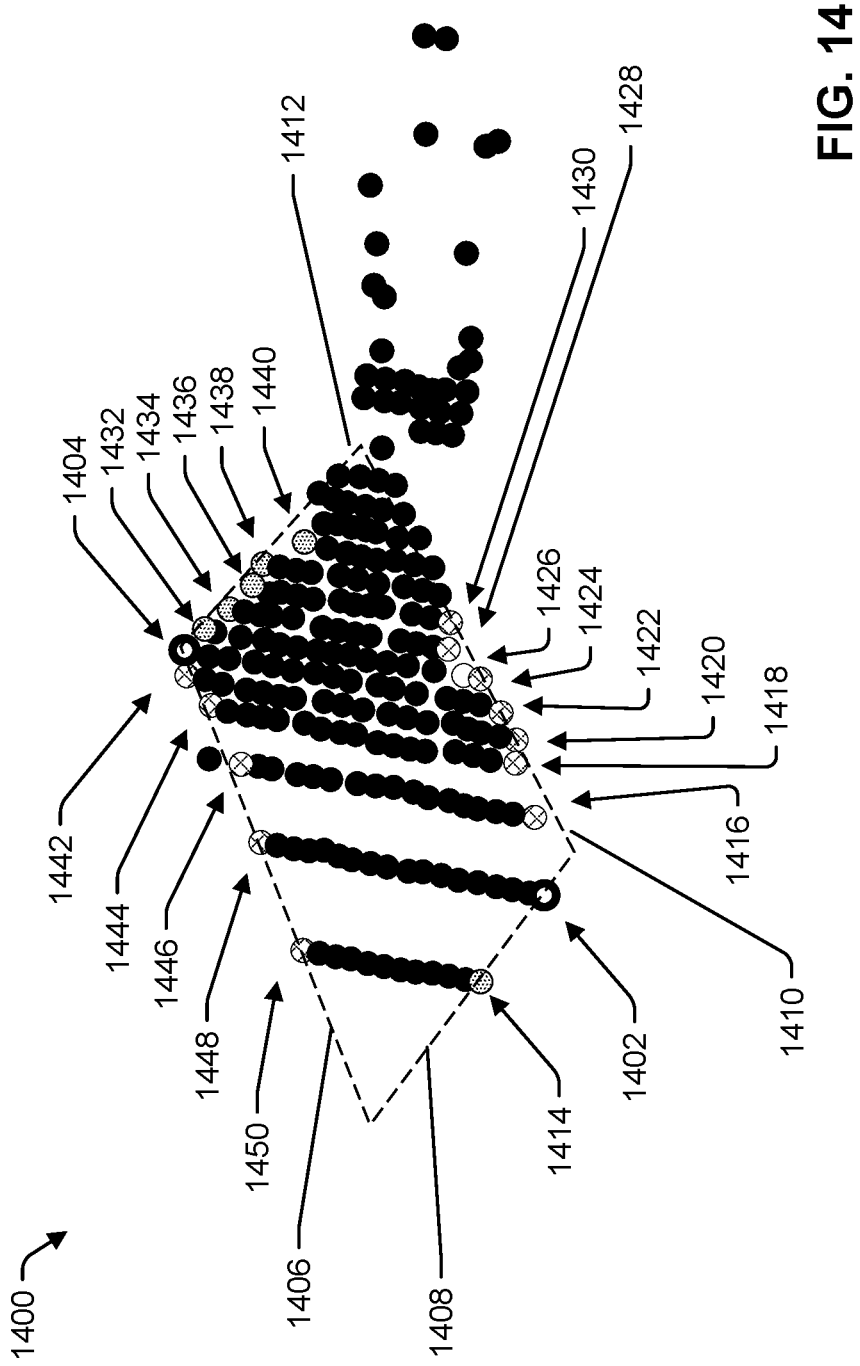
FIG. 14 illustrates another exemplary cluster with lines fitted to the points of the cluster, in accordance with at least one embodiment of the subject disclosure.

FIG. 14 illustrates another exemplary cluster 1400 with lines fitted to the points of the cluster, in accordance with at least one embodiment of the subject disclosure. Exemplary cluster 1400 is provided as an illustrative example to aid in understanding and is not intended to limit the scope of the subject disclosure. The exemplary cluster 1400 illustrates a left inflection point 1402 and a right inflection point 1404. The left inflection point 1402 and right inflection point 1404 generally correspond to the inflection points identified by method 1300, as described in more detail above with reference to FIG. 13.

The exemplary cluster 1400 also depicts a plurality of points that can potentially correspond to one or more of the four sides that provide a bounding quadrilateral of the cluster 1400. For example, the exemplary cluster 1400 illustrates a set of points that includes a point 1414 on one side of the left inflection point 1402, where the point 1414 corresponds to a first side (e.g., $S_1$). Cluster 1400 also illustrates a set of points that includes the points 1416-1430 on the other side of the left inflection point 1402, where the points 1416-1430 correspond to a second side (e.g., $S_2$). Cluster 1400 also illustrates a set of points 1432-1440 on one side of the right inflection point 1404, where the points 1432-1440 correspond to a third side (e.g., $S_3$). Cluster 1400 also illustrates a set of points 1442-1450 on the other side of the right inflection point 1404, where the points 1442-1450 correspond to a fourth side (e.g., $S_4$).

Referring again to FIG. 13, the method 1300 also includes, at block 1308, fitting lines to each set of points. In some implementations, the processor(s) 130 of FIG. 3 can fit lines to each side using the RANSAC method, a first order polynomial fit, and/or other fitting technique as appropriate. For example, referring against to FIG. 14, fitting a line corresponding to the point 1414 can use a first order polynomial fit, as there is only one point in the set of points corresponding to the first side (e.g., one point on one side of the left inflection point 1402). Fitting a line corresponding to the set of points 1416-1430 can use the RANSAC method, as there are eight points corresponding to the second side (e.g., eight points one the other side of the left inflection point 1402). In some configurations, fitting lines to each side can be an iterative process to ensure at least a minimum number of points match the fit. This minimum number of points can be determined by reference to a particular threshold.

Referring again to FIG. 14, the exemplary cluster 1400 depicts the lines 1406, 1408, 1410, and 1412 that have been fitted to various points on either side of the inflection points 1402 and 1402. In some implementations, the fitted lines can include a first line boundary 1408 fitted to the point 1414, a second boundary line 1410 fitted to the set of points 1416-1430, a third boundary line 1412 fitted to the set of points 1432-1440, and a fourth boundary line 1406 fitted to the set of points 1444-1450. The combination of the boundary lines 1406, 1408, 1410, and 1412 provide a bounding quadrilateral for the region in the point cloud in which the calibration standard resides.

Referring again to FIG. 13, the method 1300 further includes, at block 1310 accepting all points near or inside the boundaries defined by the boundary lines. For example, the processor(s) 130 of FIG. 1 can accept all points near or inside the bounding quadrilateral provided by the boundary lines 1406, 1408, 1410, and 1412 of FIG. 14. In some configurations, the processor(s) 130 of FIG. 1 can identify points near the boundary lines 1406, 1408, 1410, and 1412 by identifying points that are within a predetermined Euclidian distance from each of the boundary lines 1406, 1408, 1410, and 1412. In some configurations the processor(s) 130 of FIG. 1 can also identify the set of points 150 of FIG. 1 that are near or inside the bounding quadrilateral. In some implementations, the boundary lines 1406, 1408, 1410, and 1412 of FIG. 14 and/or the set of points 150 of FIG. 1 can be stored at the memory 132 of FIG. 1.

Although the method 1300 and the exemplary cluster 1400 use the terms "left" and "right" to describe grouping of points, other terms can be used to denote and/or describe the groupings of points, clusters, lines, endpoints, edges, boundary lines, inflection points, etc. without departing from the scope of the present disclosure.

Figure 15:
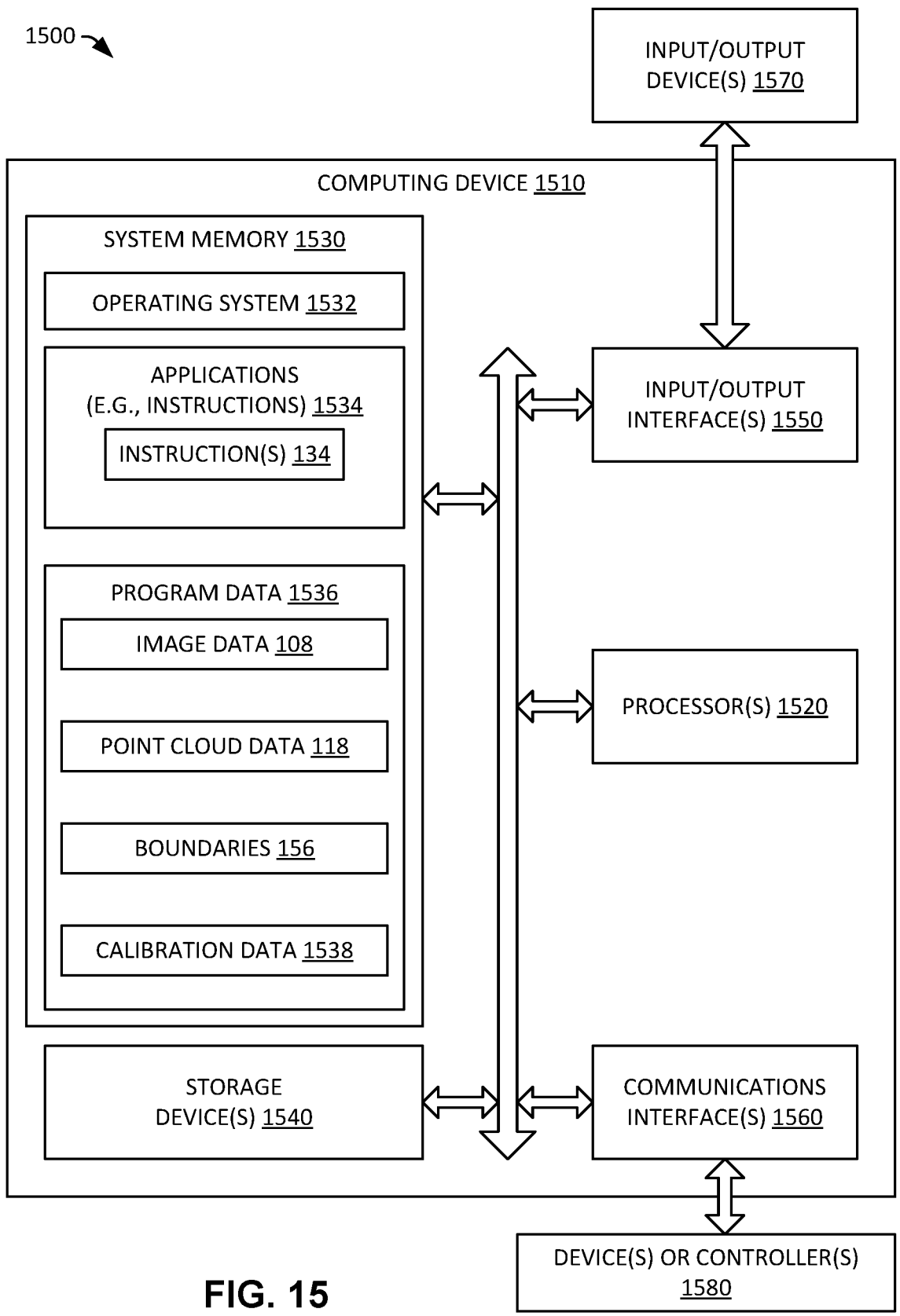
FIG. 15 illustrates a block diagram of a computing environment including a computing device configured to support aspects of computer-implemented methods and computer-executable program instructions (or code) according to the subject disclosure.

FIG. 15 is a block diagram of a computing environment 1500 including a computing device 1510 configured to support aspects of computer-implemented methods and computer-executable program instructions (or code) according to the present disclosure. For example, the computing device 1510, or portions thereof, is configured to execute instructions to initiate, perform, or control one or more operations described in more detail above with reference to FIGS. 1-14. In a particular aspect, the computing device 1510 can include the computing device(s) 110, the camera 102, and/or the lidar system 112 of FIG. 1, one or more servers, one or more virtual devices, or a combination thereof.

The computing device 1510 includes one or more processors 1520. In a particular aspect, the processor(s) 1520 correspond to the processor(s) 130 of FIG. 1. The processor(s) 1520 is configured to communicate with system memory 1530, one or more storage devices 1540, one or more input/output interfaces 1550, one or more communications interfaces 1560, or any combination thereof. The system memory 1530 includes volatile memory devices (e.g., random access memory (RAM) devices), nonvolatile memory devices (e.g., read-only memory (ROM) devices, programmable read-only memory, and flash memory), or both. The system memory 1530 stores an operating system 1532, which can include a basic input/output system for booting the computing device 1510 as well as a full operating system to enable the computing device 1510 to interact with users, other programs, and other devices. The system memory 1530 stores system (program) data 1536, such as the instructions 134, the contour metric(s) 136, the distribution criteria 138, the distance metric(s) 140, the distribution of signal intensities 142, the cluster size criteria 144, the dimensions of calibration standard 146, the set of points 150, the subsets of the point cloud data 152, the clusters 154, the boundaries 156, the image data 108, the point cloud data 118 of FIG. 1, or a combination thereof.

The system memory 1530 includes one or more applications 1534 (e.g., sets of instructions) executable by the processor(s) 1520. As an example, the one or more applications 1534 include the instructions 134 executable by the processor(s) 1520 to initiate, control, or perform one or more operations described with reference to FIGS. 1-14. To illustrate, the one or more applications 1534 include the instructions 134 executable by the processor(s) 1520 to initiate, control, or perform one or more operations described with reference to the set of points 150, the subsets of the point cloud data 152, the clusters 154, the boundaries 156, or a combination thereof.

In a particular implementation, the system memory 1530 includes a non-transitory, computer readable medium (e.g., a computer-readable storage device) storing the instructions 134 that, when executed by the processor(s) 1520, cause the processor(s) 1520 to initiate, perform, or control operations to automatically detect a calibration standard in an unstructured lidar point cloud.

The operations include obtaining point cloud data representing locations in three-dimensional (3D) space of points of a point cloud. The operations also include selecting for further processing by the one or more processors one or more subsets of the point cloud data based at least in part on a contour metric. The operations also include grouping sets of points of the one or more subsets of the point cloud into one or more clusters based at least in part on one or more distance metrics. The operations further include, for a cluster that satisfies one or more cluster size criteria based on dimensions of a calibration standard, determining whether a distribution of signal intensities of points of the cluster satisfies a distribution criterion. The operations also include, based on a determination that the distribution of signal intensities of points satisfies the distribution criterion, determining, based on the cluster, boundaries of a region that represents the calibration standard and storing data identifying a set of points of the point cloud that correspond to the calibration standard, the set of points identified based on the boundaries of the region that represents the calibration standard.

The one or more storage devices 1540 include nonvolatile storage devices, such as magnetic disks, optical disks, or flash memory devices. In a particular example, the storage devices 1540 include both removable and non-removable memory devices. The storage devices 1540 are configured to store an operating system, images of operating systems, applications (e.g., one or more of the applications 1534), and program data (e.g., the program data 1536). In a particular aspect, the system memory 1530, the storage devices 1540, or both, include tangible computer-readable media. In a particular aspect, one or more of the storage devices 1540 are external to the computing device 1510.

The one or more input/output interfaces 1550 enable the computing device 1510 to communicate with one or more input/output devices 1570 to facilitate user interaction. For example, the one or more input/output interfaces 1550 can include a display interface, an input interface, or both. For example, the input/output interface 1550 is adapted to receive input from a user, to receive input from another computing device, or a combination thereof. In some implementations, the input/output interface 1550 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, New Jersey). In some implementations, the input/output device(s) 1570 include one or more user interface devices and displays, including some combination of buttons, keyboards, pointing devices, displays, speakers, microphones, touch screens, and other devices. In a particular aspect, the input/output device(s) 1570 include the interface(s) 126 of FIG. 1.

The processor(s) 1520 are configured to communicate with devices or controllers 1580 via the one or more communications interfaces 1560. For example, the one or more communications interfaces 1560 can include a network interface. The devices or controllers 1580 can include, for example, the camera 102, the lidar system 112 of FIG. 1, one or more other devices, or any combination thereof.

In some implementations, a non-transitory, computer readable medium (e.g., a computer-readable storage device) stores instructions that, when executed by one or more processors, cause the one or more processors to initiate, perform, or control operations to perform part of or all the functionality described above. For example, the instructions can be executable to implement one or more of the operations or methods of FIGS. 1-14. In some implementations, part or all of one or more of the operations or methods of FIGS. 1-14 can be implemented by one or more processors (e.g., one or more central processing units (CPUs), one or more graphics processing units (GPUs), one or more digital signal processors (DSPs)) executing instructions, by dedicated hardware circuitry, or any combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations can be apparent to those of skill in the art upon reviewing the disclosure. Other implementations can be utilized and derived from the disclosure, such that structural and logical substitutions and changes can be made without departing from the scope of the disclosure. For example, method operations can be performed in a different order than shown in the figures or one or more method operations can be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results can be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features can be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter can be directed to less than all of the features of any of the disclosed examples. Accordingly, the scope of the disclosure is defined by the following claims and their equivalents.

Further, the disclosure comprises embodiments according to the following clauses:

Clause 1. A method (200, 300, 400, 700, 900, 1300) comprising: using a processor (130) to perform the operations of: obtaining (202), at one or more processors, point cloud data (118) representing locations in three-dimensional (3D) space of points of a point cloud; selecting (204) for further processing by the one or more processors one or more subsets of the point cloud data (152) based at least in part on a contour metric (136); grouping (206), by the one or more processors, sets of points of the one or more subsets of the point cloud data (152) into one or more clusters (154) based at least in part on one or more distance metrics (140); for a cluster (154) that satisfies one or more cluster size criteria (144) based on dimensions (146) of a calibration standard (120), determining (208), by the one or more processors (130), whether a distribution of signal intensities (142) of points of the cluster (154) satisfies a distribution criterion (138); based on a determination that the distribution of signal intensities (142) of points satisfies the distribution criterion (138), determining (210), by the one or more processors (130) based on the cluster (154), boundaries (156) of a region that represents the calibration standard (120); and storing (212), by the one or more processors (130), data identifying a set of points (150) of the point cloud that correspond to the calibration standard (120), the set of points (150) identified based on the boundaries (156) of the region that represents the calibration standard (120).

Clause 2. The method (200, 300, 400, 700, 900, 1300) of clause 1, wherein the point cloud data (118) represents returns from a lidar system (112).

Clause 3. The method (200, 300, 400, 700, 900, 1300) of clause 2, further comprising: obtaining (302) image data (108) from a camera (102) associated with the lidar system (112); and selecting (306) a search region of the point cloud based on the image data (108) and based on coarse calibration data associated with the camera (102) and the lidar system (112).

Clause 4. The method (200, 300, 400, 700, 900, 1300) of any of clauses 1 to 3, further comprising, before selecting the one or more subsets of the point cloud data (152) based at least in part on the contour metric (136): obtaining (302) image data (108) including an image of the calibration standard (120); projecting (304) the point cloud data (118) onto the image to generate a two-dimensional (2D) projection of at least a portion of the point cloud; selecting (306) a first set of points of the point cloud that correspond to points of the 2D projection bounded by the image of the calibration standard; and selecting (312) second set of points of the point cloud that are within a threshold distance of one or more of the first set of points, wherein the second set of points represent a search space to be searched for points corresponding to the calibration standard (312, 314-342).

Clause 5. The method (200, 300, 400, 700, 900, 1300) of any of clauses 1 to 4, further comprising determining (314) values of the contour metric (136) for a plurality of points of the point cloud, wherein determining a value of the contour metric (136) for a particular point comprises: determining (402) a first normal for a first surface including points of the point cloud that are within a first threshold distance of the particular point; determining (402) a second normal for a second surface including points of the point cloud that are within a second threshold distance of the particular point; and determining (402) a difference between the first normal and the second normal, wherein a magnitude of the difference represents a value of the contour metric for the particular point.

Clause 6. The method (200, 300, 400, 700, 900, 1300) of any of clauses 1 to 5, wherein selecting (204) the one or more subsets of the point cloud data (152) based at least in part on the contour metric (136) comprises excluding (404) from further processing points associated with contour metric values that are less than or equal to a contour threshold.

Clause 7. The method (200, 300, 400, 700, 900, 1300) of any of clauses 1 to 6, further comprising: for each point of the one or more subsets of the point cloud data (152), determining (402) a normal of a surface that includes the point and includes points of the point cloud that are within a threshold distance of the point; identifying (316) a first set of points that are associated with consistent normals; and determining (318) a plane in the 3D space based on the first set of points; determining (320) a second set of points that are within a threshold distance to the plane, wherein the grouping (206) the sets of points into one or more clusters (154) comprises assigning (322) a point of the second set of points to a particular cluster (154) based on a distance between the point and other points of the particular cluster.

Clause 8. The method (200, 300, 400, 700, 900, 1300) of clause 7, wherein the grouping (206) the sets of points into one or more clusters (154) further comprises, after determining an initial set of clusters, generating (328) a candidate cluster, wherein generating the candidate cluster comprises selectively aggregating (326, 328) clusters of the initial set of clusters based on a first cluster size threshold (144) and proximity of points of the initial set of clusters to one another until the candidate cluster has a size that satisfies a second cluster size threshold (144), wherein the first cluster size threshold is based on (326) a first dimension of the calibration standard (146), and wherein the second cluster size threshold is based on (328) a second dimension of the calibration standard (146), and wherein the first dimension is distinct from the second dimension.

Clause 9. The method (200, 300, 400, 700, 900, 1300) of any of clauses 1 to 8, wherein the distribution criterion (138) is based on a number of colors represented in a pattern of the calibration standard (120) (330, FIG. 7).

Clause 10. The method (200, 300, 400, 700, 900, 1300) of any of clauses 1 to 9, wherein determining (210) the boundaries (156) the region that represents the calibration standard (120) comprises: determining (334) a plane in the 3D space based on points of the cluster (154); adding (334) points within a threshold distance of the plane to the cluster; projecting (336) the points of the cluster (154) onto the plane; determining (902) a scanning beam direction relative to the point cloud, wherein determining (902) the scanning beam direction comprises: determining (904) pairs of points of the cluster (154) that are within a threshold distance of one another; determining (906), for each pair of points, a unit vector indicting a direction from one point of the pair to the other point of the pair; determining (908) a histogram of pointing directions of the pairs of points; and determining (910) the scanning beam direction based on the histogram.

Clause 11. The method (200, 300, 400, 700, 900, 1300) of any of clauses 1 to 10, further comprising: fitting (912) lines to the points of the cluster; designating (920) edge points of the lines; and determining (928-938; 1302-1310) the boundaries based at least in part on the edge points.

Clause 12. The method (200, 300, 400, 700, 900, 1300) of clause 11, wherein determining (928-938; 1302-1310) the boundaries based at least in part on the endpoints comprises: determining (338, FIGS. 9, 13) an orientation of the calibration standard; and selecting a boundary determination process based on the orientation of the calibration standard.

Clause 13. The method (200, 300, 400, 700, 900) of any of clauses 11 to 12, wherein determining the boundaries (928-938; 1302-1310) based at least in part on the endpoints comprises: identifying (934) a first line corresponding to a first boundary of the boundaries, wherein the first line is selected based on positions of the lines; identifying (934) a second line corresponding to a second boundary of the boundaries, wherein the second line is selected based on the positions of the lines; determining (936) a third line corresponding to a third boundary of the boundaries, wherein the third line is based on a first set of endpoints of the lines; and determining (936) a fourth line corresponding to a fourth boundary of the boundaries, wherein the fourth line is based on a second set of endpoints of the lines.

Clause 14. The method (200, 300, 400, 700, 900, 1300) of any of clauses 11 to 13, wherein determining (928-938; 1302-1310) the boundaries based at least in part on the endpoints comprises: identifying (1304) an inflection point of positions of the endpoints; determining (1306, 1308) a first line corresponding to a first boundary of the boundaries, wherein the first line is based on upper endpoints of a first set of the lines, wherein the first set of the lines are disposed on a first side of the inflection point; determining (1306, 1308) a second line corresponding to a second boundary of the boundaries, wherein the second line is based on upper endpoints of a second set of the lines, wherein the second set of the lines are disposed on a second side of the inflection point; determining (1306, 1308) a third line corresponding to a third boundary of the boundaries, wherein the third line is based on lower endpoints of the first set of the lines; and determining (1306, 1308) a fourth line corresponding to a fourth boundary of the boundaries, wherein the fourth line is based on lower endpoints of the second set of the lines.

Clause 15. The method (200, 300, 400, 700, 900, 1300) of any of clauses 11 to 14, further comprising filtering (926) the lines based on length and direction before determining the boundaries.

Clause 16. A system (100) comprising: a memory (132) configured to store instructions (134); and one or more processors (130) configured to: obtain (202), at one or more processors (130), point cloud data (118) representing locations in three-dimensional (3D) space of points of a point cloud; select (204) for further processing by the one or more processors (130) one or more subsets of the point cloud data (152) based at least in part on a contour metric (136); group (206), by the one or more processors, sets of points of the one or more subsets of the point cloud data (152) into one or more clusters (154) based at least in part on one or more distance metrics (140); for a cluster (154) that satisfies one or more cluster size criteria (144) based on dimensions (146) of a calibration standard (120), determine (208), by the one or more processors (130), whether a distribution of signal intensities (142) of points of the cluster (154) satisfies a distribution criterion (138); based on a determination that the distribution of signal intensities (142) of points satisfies the distribution criterion (138), determine (210), by the one or more processors (130) based on the cluster (154), boundaries (156) of a region that represents the calibration standard (120); and store (212), by the one or more processors (130), data identifying a set of points (150) of the point cloud that correspond to the calibration standard (120), the set of points (150) identified based on the boundaries (156) of the region that represents the calibration standard (120).

Clause 17. The system (100) of clause 16, further comprising an aircraft, a component of a vehicle (148) or structure, a component of a vehicle or structure, or any combination thereof coupled to the one or more processors (130).

Clause 18. The system (100) of clause, wherein the point cloud data (118) represents returns from a lidar system (112) coupled to the vehicle (148) or structure, the component of the vehicle or structure, or any combination thereof.

Clause 19. The system (100) of clause 18, wherein the one or more processors (130) is further configured to: obtain (302) image data (108) from a camera (102) associated with the lidar system (112); and select (306) a search region of the point cloud based on the image data (108) and based on coarse calibration data associated with the camera (102) and the lidar system (112).

Clause 20. A non-transient, computer-readable medium (132) storing instructions executable by one or more processors (130) to perform operations comprising: obtaining (202), at one or more processors, point cloud data (118) representing locations in three-dimensional (3D) space of points of a point cloud; selecting (204) for further processing by the one or more processors one or more subsets of the point cloud data (152) based at least in part on a contour metric (136); grouping (206), by the one or more processors, sets of points of the one or more subsets of the point cloud data (152) into one or more clusters (154) based at least in part on one or more distance metrics (140); for a cluster (154) that satisfies one or more cluster size criteria (144) based on dimensions (146) of a calibration standard (120), determining (208), by the one or more processors (130), whether a distribution of signal intensities (142) of points of the cluster (154) satisfies a distribution criterion (138); based on a determination that the distribution of signal intensities (142) of points satisfies the distribution criterion (138), determining (210), by the one or more processors (130) based on the cluster (154), boundaries (156) of a region that represents the calibration standard (120); and storing (212), by the one or more processors (130), data identifying a set of points (150) of the point cloud that correspond to the calibration standard (120), the set of points (150) identified based on the boundaries (156) of the region that represents the calibration standard (120).

What is claimed is:

1. A method comprising:
   obtaining, at one or more processors, point cloud data representing locations in three-dimensional (3D) space of points of a point cloud;
   selecting for further processing by the one or more processors one or more subsets of the point cloud data based at least in part on a contour metric;
   grouping, by the one or more processors, sets of points of the one or more subsets of the point cloud data into one or more clusters based at least in part on one or more distance metrics that are based on one or more respective Euclidean distance thresholds;
   for a cluster that satisfies one or more cluster size criteria based on dimensions of a calibration standard, determining, by the one or more processors, whether a distribution of signal intensities of points of the cluster satisfies a distribution criterion;
   based on a determination that the distribution of signal intensities of points satisfies the distribution criterion, determining, by the one or more processors based on the cluster, boundaries of a region that represents the calibration standard; and
   storing, by the one or more processors, data identifying a set of points of the point cloud that correspond to the calibration standard, the set of points identified based on the boundaries of the region that represents the calibration standard.

2. The method of claim 1, wherein the point cloud data represents returns from a lidar system.

3. The method of claim 2, further comprising:
   obtaining image data from a camera associated with the lidar system; and
   selecting a search region of the point cloud based on the image data and based on coarse calibration data associated with the camera and the lidar system.

4. The method of claim 1, further comprising, before selecting the one or more subsets of the point cloud data based at least in part on the contour metric:
   obtaining image data including an image of the calibration standard;
   projecting the point cloud data onto the image to generate a two-dimensional (2D) projection of at least a portion of the point cloud;
   selecting a first set of points of the point cloud that correspond to points of the 2D projection bounded by the image of the calibration standard; and
   selecting second set of points of the point cloud that are within a threshold distance of one or more of the first set of points, wherein the second set of points represent a search space to be searched for points corresponding to the calibration standard.

5. The method of claim 1, further comprising determining values of the contour metric for a plurality of points of the point cloud, wherein determining a value of the contour metric for a particular point comprises:
   determining a first normal for a first surface including points of the point cloud that are within a first threshold distance of the particular point;

determining a second normal for a second surface including points of the point cloud that are within a second threshold distance of the particular point; and determining a difference between the first normal and the second normal, wherein a magnitude of the difference represents a value of the contour metric for the particular point.

6. The method of claim 1, further comprising:

for each point of the one or more subsets of the point cloud data, determining a normal of a surface that includes the point and includes points of the point cloud that are within a threshold distance of the point;

identifying a first set of points that are associated with consistent normals;

determining a plane in the 3D space based on the first set of points; and determining a second set of points that are within a threshold distance to the plane, wherein the grouping the sets of points into one or more clusters comprises assigning a point of the second set of points to a particular cluster based on a distance between the point and other points of the particular cluster.

7. The method of claim 6, wherein the grouping the sets of points into one or more clusters further comprises, after determining an initial set of clusters, generating a candidate cluster, wherein generating the candidate cluster comprises selectively aggregating clusters of the initial set of clusters based on a first cluster size threshold and proximity of points of the initial set of clusters to one another until the candidate cluster has a size that satisfies a second cluster size threshold, wherein the first cluster size threshold is based on a first dimension of the calibration standard, wherein the second cluster size threshold is based on a second dimension of the calibration standard, and wherein the first dimension is distinct from the second dimension.

8. The method of claim 1, wherein the distribution criterion is based on a number of colors represented in a pattern of the calibration standard.

9. The method of claim 1, wherein determining the boundaries the region that represents the calibration standard comprises:

determining a plane in the 3D space based on points of the cluster;

adding points within a threshold distance of the plane to the cluster; projecting the points of the cluster onto the plane;

determining a scanning beam direction relative to the point cloud, wherein determining the scanning beam direction comprises:

determining pairs of points of the cluster that are within a threshold distance of one another;

determining, for each pair of points, a unit vector indicting a direction from one point of the pair to the other point of the pair;

determining a histogram of pointing directions of the pairs of points; and determining the scanning beam direction based on the histogram.

10. The method of claim 1, further comprising:

fitting lines to the points of the cluster;

designating edge points of the lines; and determining the boundaries based at least in part on the edge points.

11. The method of claim 10, wherein determining the boundaries based at least in part on the edge points comprises:

determining an orientation of the calibration standard; and selecting a boundary determination process based on the orientation of the calibration standard.

12. The method of claim 10, wherein determining the boundaries based at least in part on the edge points comprises:

identifying a first line corresponding to a first boundary of the boundaries, wherein the first line is selected based on positions of the lines;

identifying a second line corresponding to a second boundary of the boundaries, wherein the second line is selected based on the positions of the lines;

determining a third line corresponding to a third boundary of the boundaries, wherein the third line is based on a first set of endpoints of the lines; and determining a fourth line corresponding to a fourth boundary of the boundaries, wherein the fourth line is based on a second set of endpoints of the lines.

13. The method of claim 10, wherein determining the boundaries based at least in part on the edge points comprises:

identifying an inflection point of positions of the endpoints;

determining a first line corresponding to a first boundary of the boundaries, wherein the first line is based on upper endpoints of a first set of the lines, wherein the first set of the lines are disposed on a first side of the inflection point;

determining a second line corresponding to a second boundary of the boundaries, wherein the second line is based on upper endpoints of a second set of the lines, wherein the second set of the lines are disposed on a second side of the inflection point;

determining a third line corresponding to a third boundary of the boundaries, wherein the third line is based on lower endpoints of the first set of the lines; and determining a fourth line corresponding to a fourth boundary of the boundaries, wherein the fourth line is based on lower endpoints of the second set of the lines.

14. The method of claim 10, further comprising filtering the lines based on length and direction before determining the boundaries.

15. The method of claim 1, wherein each distance metric groups points of the one or more subsets according to a respective Euclidean distance from a plane onto which the one or more subsets of the point cloud data have been projected.

16. A system comprising:

a memory configured to store instructions; and one or more processors configured to:

obtain, at one or more processors, point cloud data representing locations in three-dimensional (3D) space of points of a point cloud;

select for further processing by the one or more processors one or more subsets of the point cloud data based at least in part on a contour metric;

group, by the one or more processors, sets of points of the one or more subsets of the point cloud data into one or more clusters based at least in part on one or more distance metrics that are based on one or more respective Euclidean distance thresholds;

for a cluster that satisfies one or more cluster size criteria based on dimensions of a calibration standard, determine, by the one or more processors, whether a distribution of signal intensities of points of the cluster satisfies a distribution criterion;

based on a determination that the distribution of signal intensities of points satisfies the distribution criterion, determine, by the one or more processors based on the cluster, boundaries of a region that represents the calibration standard; and store, by the one or more processors, data identifying a set of points of the point cloud that correspond to the calibration standard, the set of points identified based on the boundaries of the region that represents the calibration standard.

17. The system of claim 16, further comprising an aircraft, a component of a vehicle or structure, a component of a vehicle or structure, or any combination thereof coupled to the one or more processors.

18. The system of claim 17, wherein the point cloud data represents returns from a lidar system coupled to the vehicle or structure, the component of the vehicle or structure, or any combination thereof.

19. A non-transient, computer-readable medium storing instructions executable by one or more processors to perform operations comprising:

obtaining, at one or more processors, point cloud data representing locations in three-dimensional (3D) space of points of a point cloud;

selecting for further processing by the one or more processors one or more subsets of the point cloud data based at least in part on a contour metric;

grouping, by the one or more processors, sets of points of the one or more subsets of the point cloud data into one or more clusters based at least in part on one or more distance metrics that are based on one or more respective Euclidean distance thresholds;

for a cluster that satisfies one or more cluster size criteria based on dimensions of a calibration standard, determining, by the one or more processors, whether a distribution of signal intensities of points of the cluster satisfies a distribution criterion;

based on a determination that the distribution of signal intensities of points satisfies the distribution criterion, determining, by the one or more processors based on the cluster, boundaries of a region that represents the calibration standard; and storing, by the one or more processors, data identifying a set of points of the point cloud that correspond to the calibration standard, the set of points identified based on the boundaries of the region that represents the calibration standard.

20. The non-transient, computer-readable medium of claim 19, storing instructions executable by one or more processors to further perform operations comprising:

obtaining image data from a camera associated with the lidar system; and selecting a search region of the point cloud based on the image data and based on coarse calibration data associated with the camera and the lidar system.

* * * * *